Fig. 33

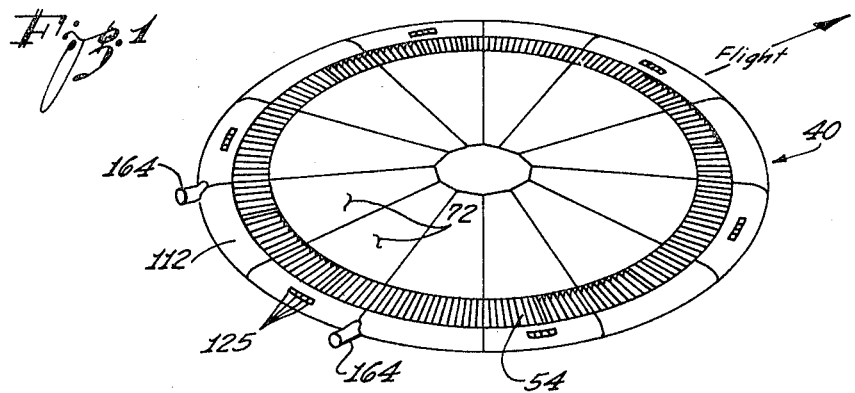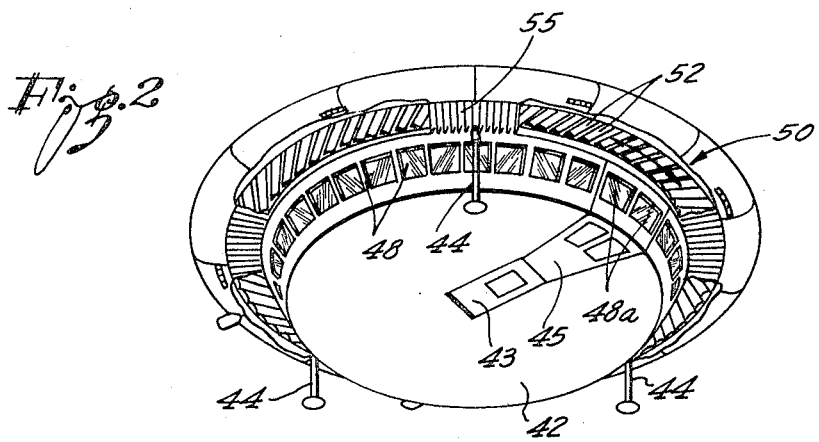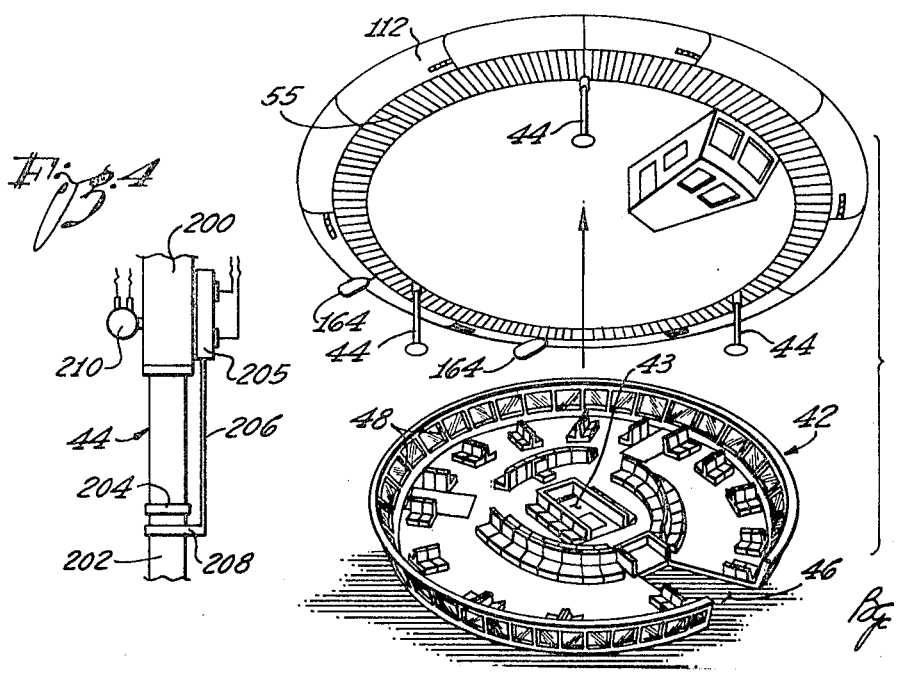

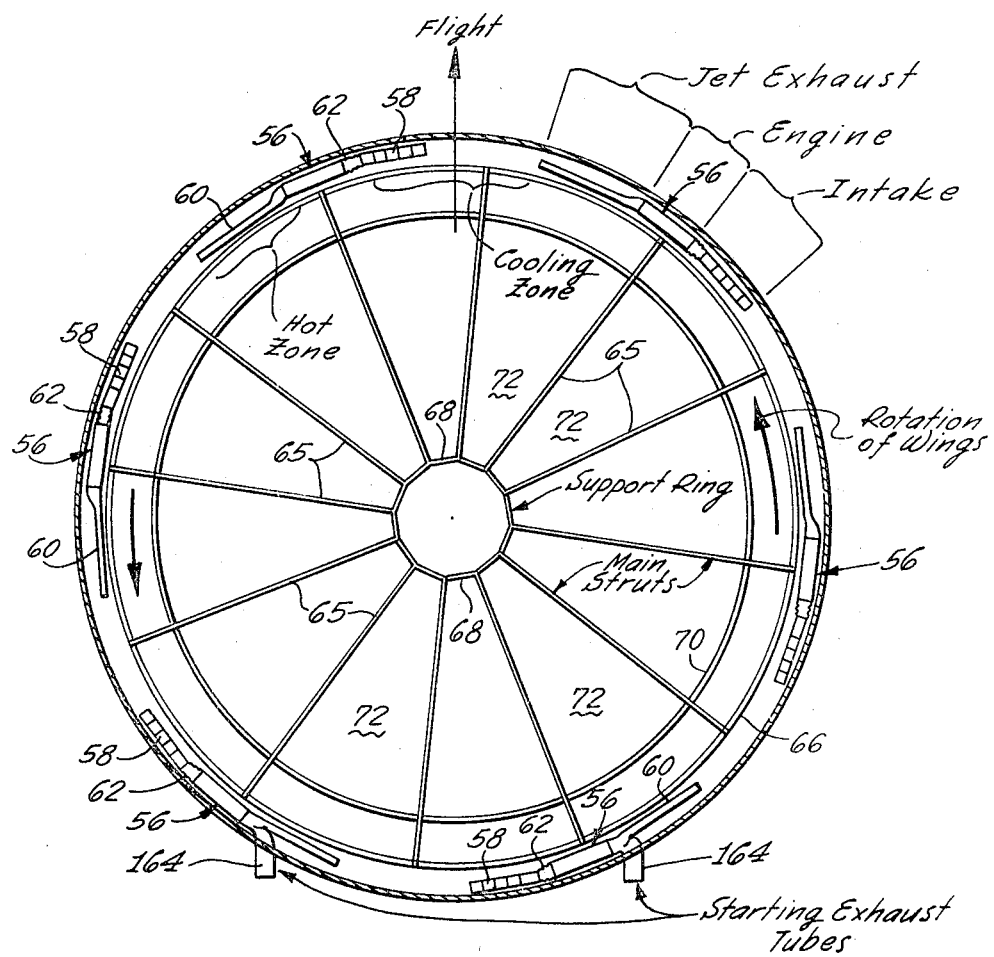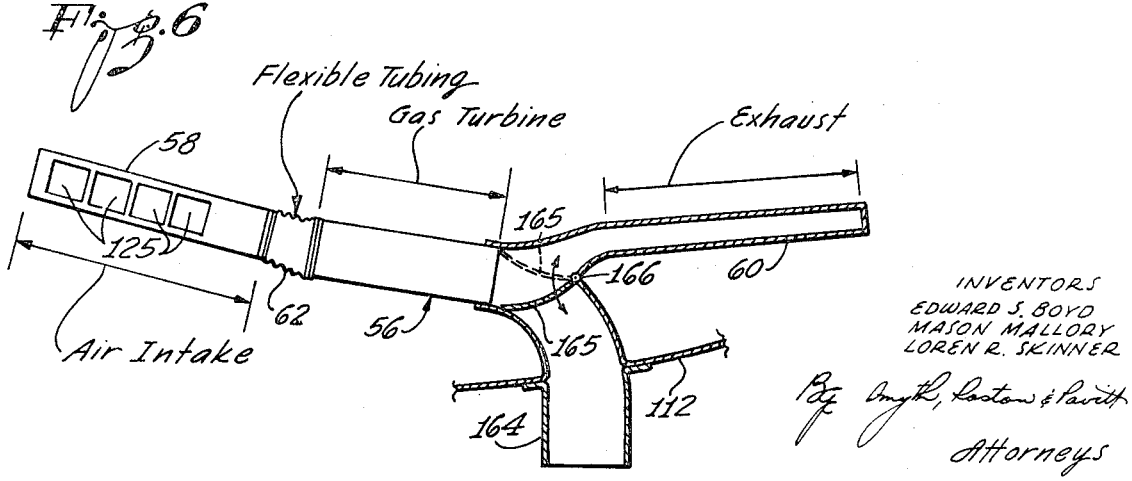

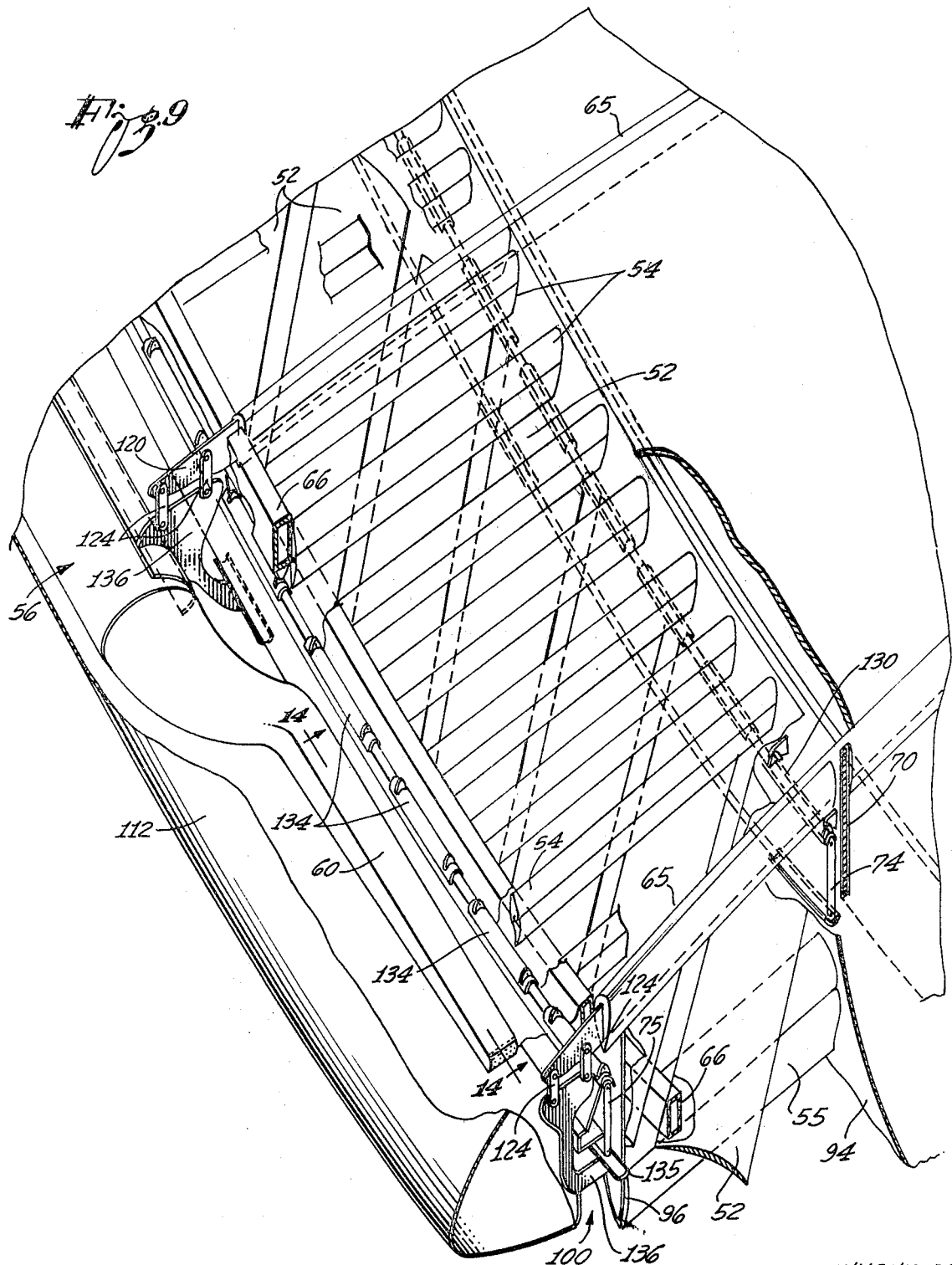

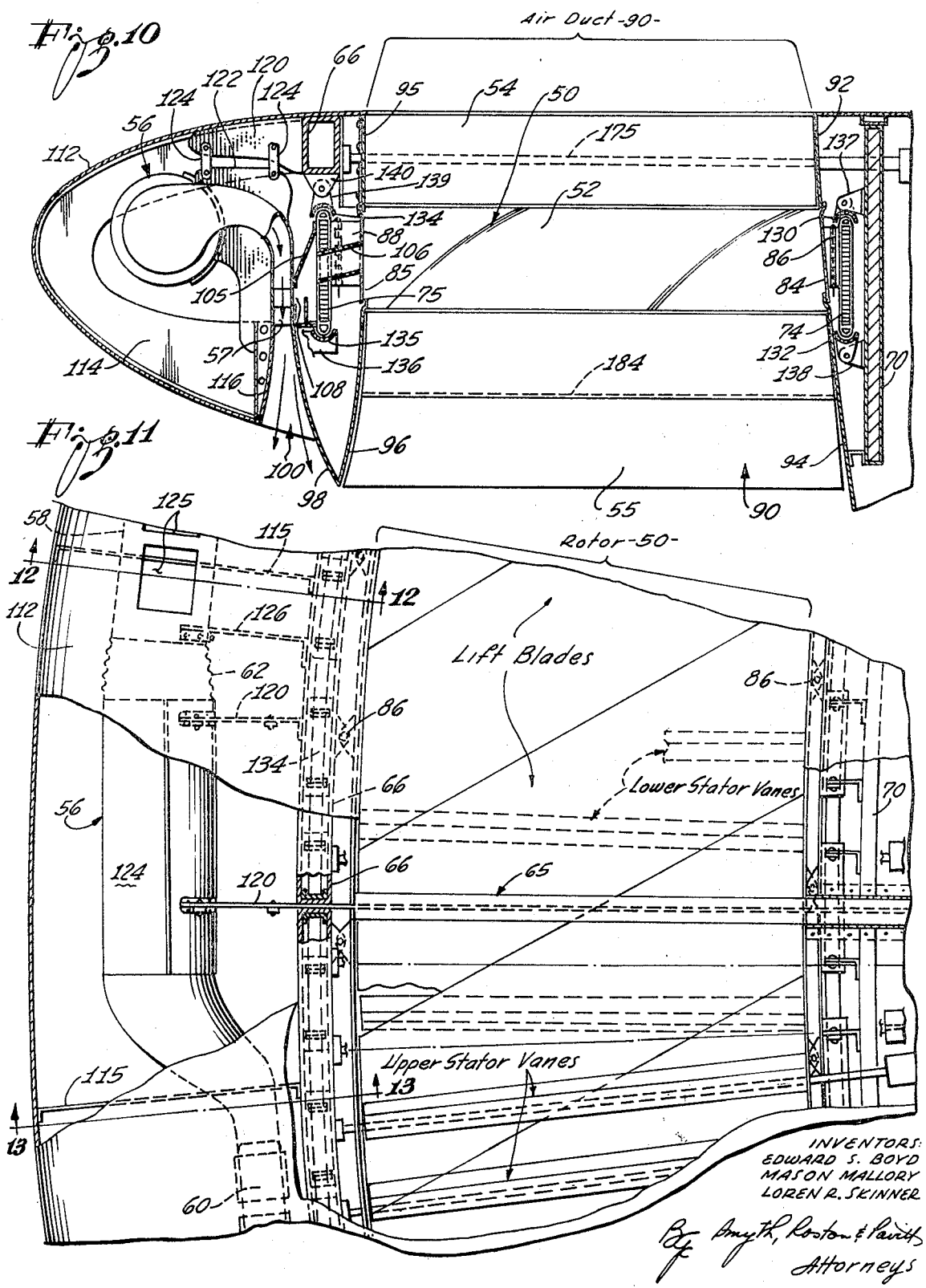

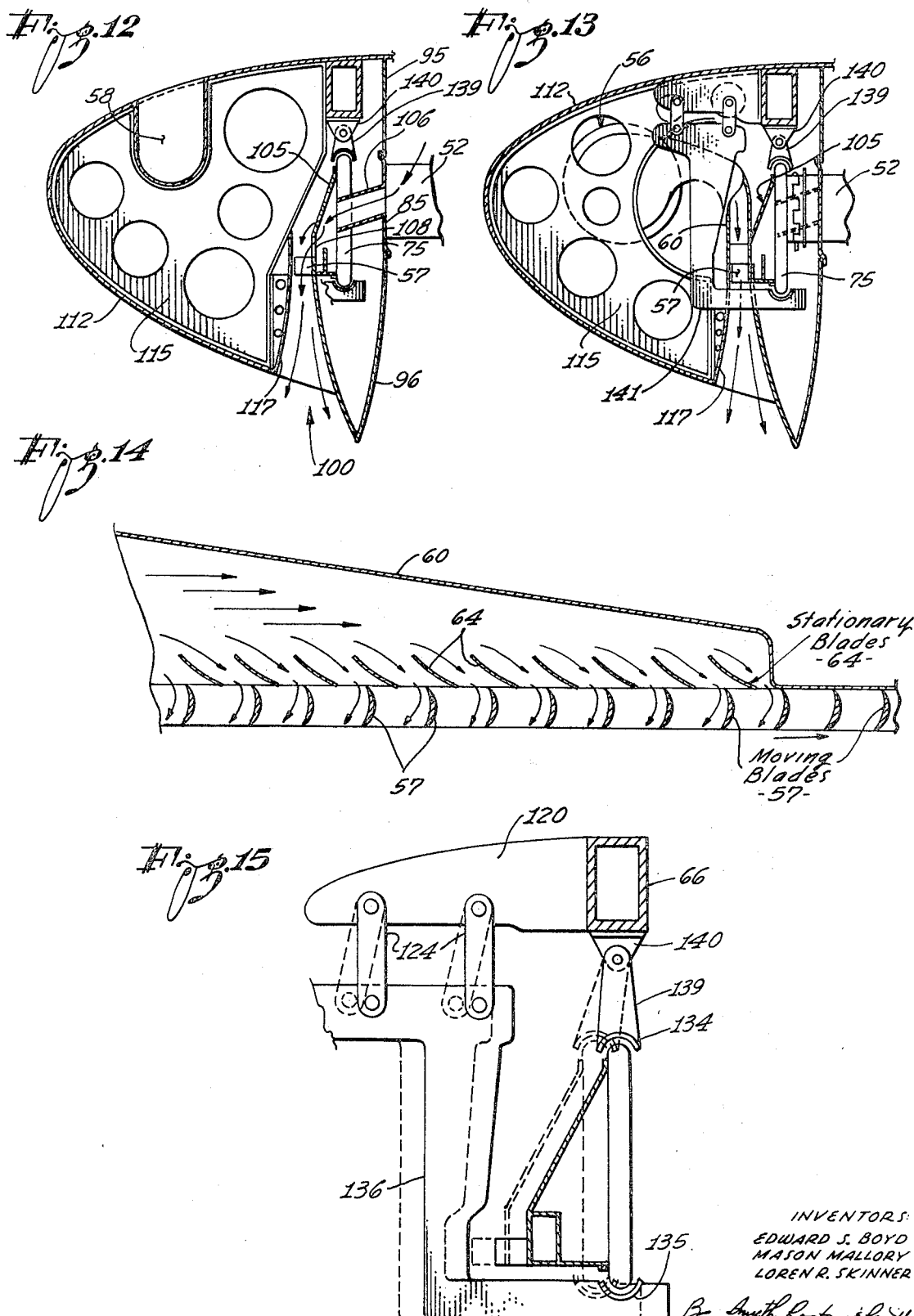

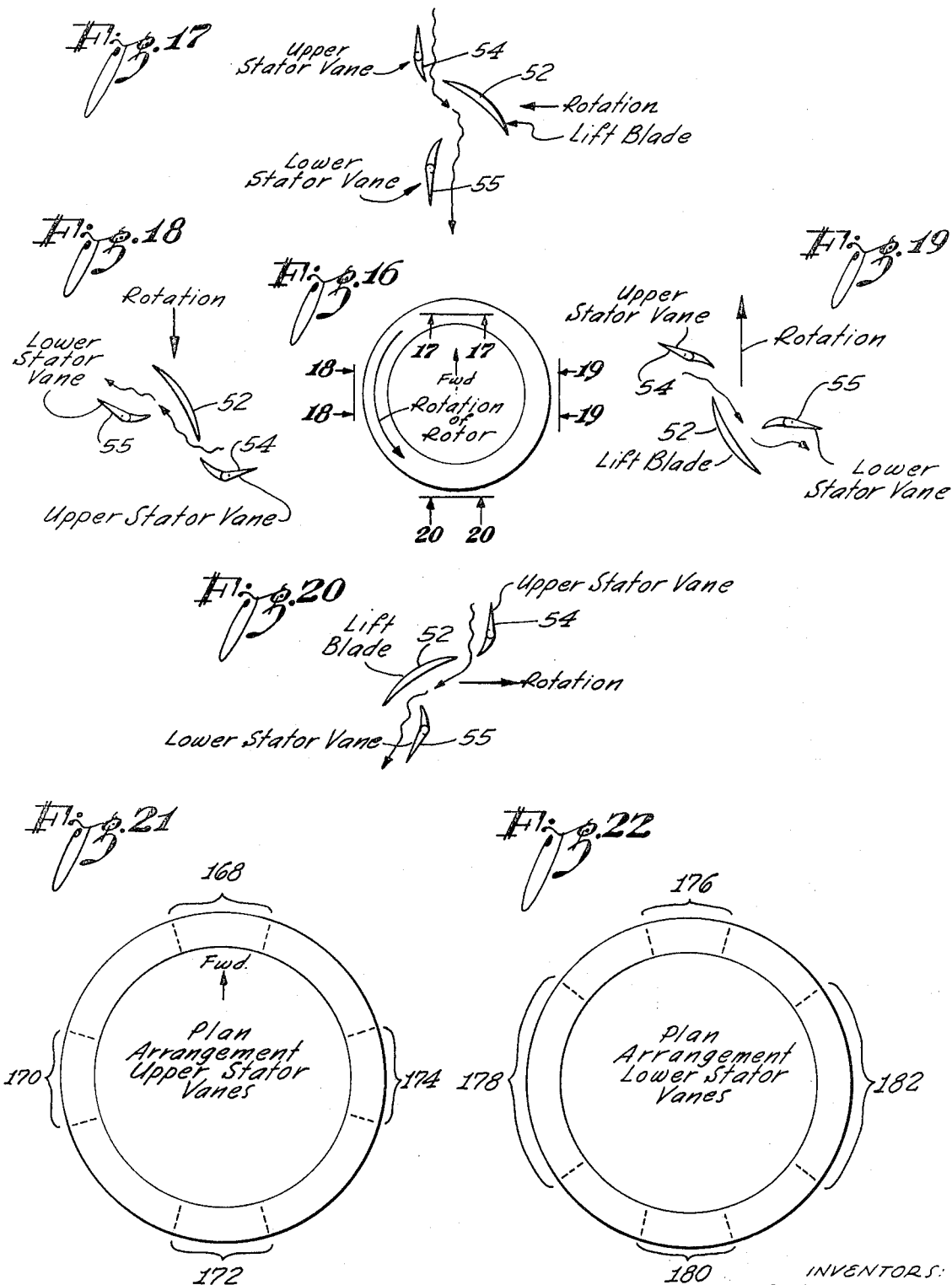

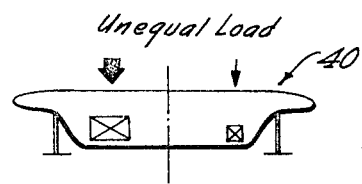
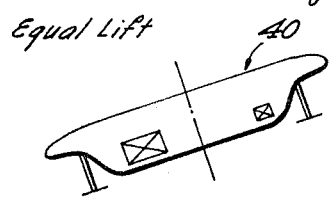
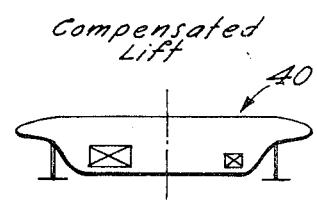
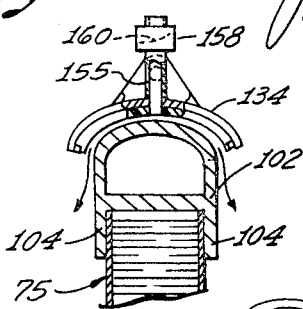
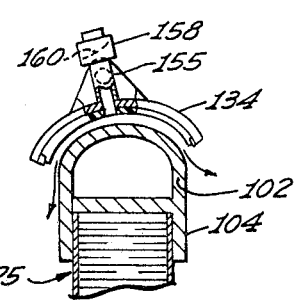
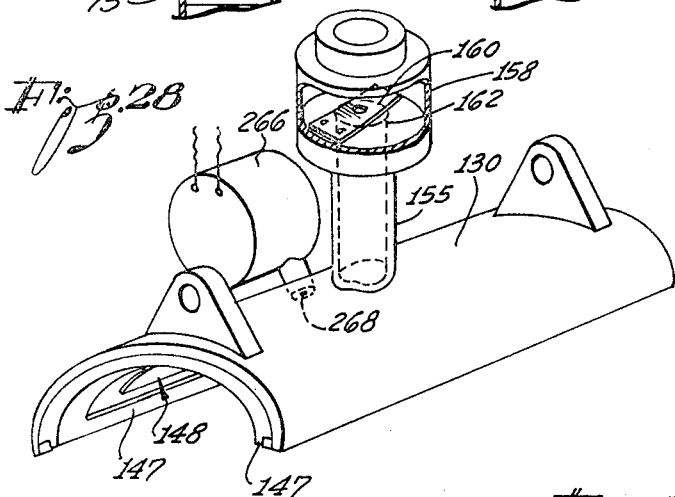
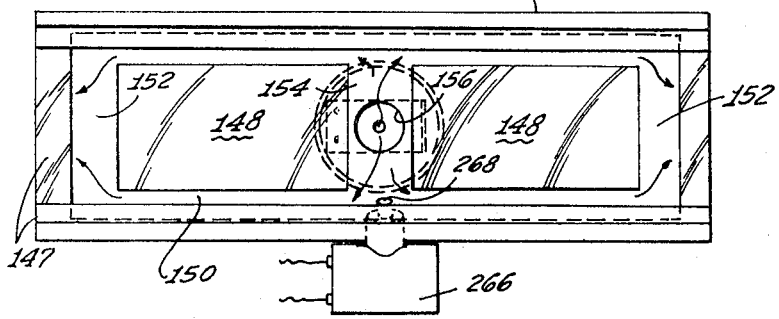
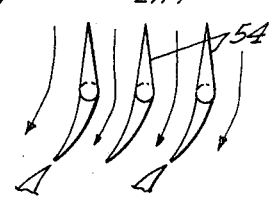
INVENTORS
EDWARD S. BOYD
MASON MALLORY
LOREN R. SKINNER
Attorneys

| | 224 | 226 | 228 | 230 | 232 | 234 | 235 | 238 | 240 | 242 |
|---|---|---|---|---|---|---|---|---|---|---|
| Green Lights | Secured | Secured | | O.K. | | O.K. | | O.K. | | O.K. |
| | Doors | Load | | Weight | | Center of Gravity | | Trim | | Rotor Air |
| Red Lights | Unlatched | Not Secured | | Excess | | Excess | | Error | | Low |
| Digital Readout | Static Load | | | C. G. Trim | | | Flight Load | | | |
| | 0 | 8 | 4 .| 2 % | 1 | 2 .| 6 % | 0 | 0 | 0 .0 % |

225, 244, 245, 246, 272

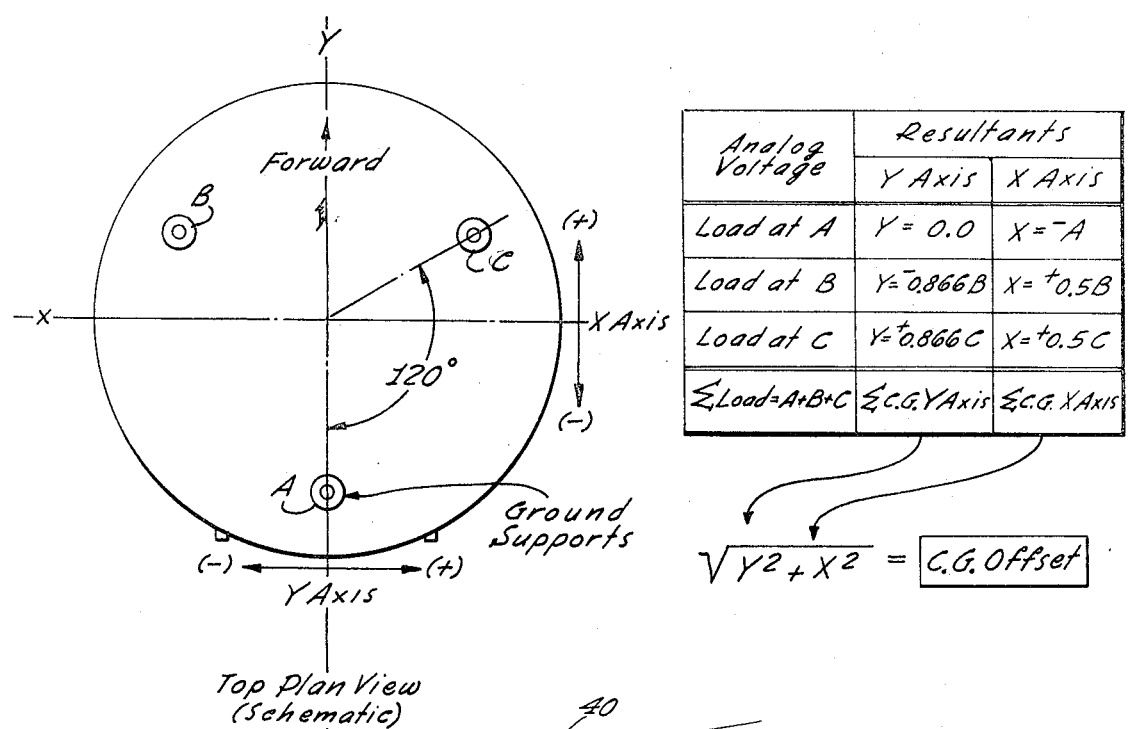

Fig. 32

| Analog Voltage | Resultants | |
|---|---|---|
| | Y Axis | X Axis |
| Load at A | Y = 0.0 | X = ⁻A |
| Load at B | Y = ⁻0.866B | X = ⁺0.5B |
| Load at C | Y = ⁺0.866C | X = ⁺0.5C |
| ΣLoad=A+B+C | ΣC.G. Y Axis | ΣC.G. X Axis |

$$\sqrt{Y^2 + X^2} = \boxed{C.G.\ Offset}$$

Top Plan View (Schematic)

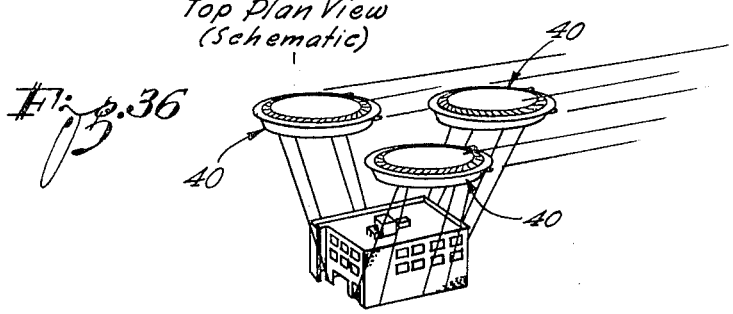

Fig. 36

INVENTORS
EDWARD S. BOYD
MASON MALLORY
LOREN R. SKINNER

Attorneys

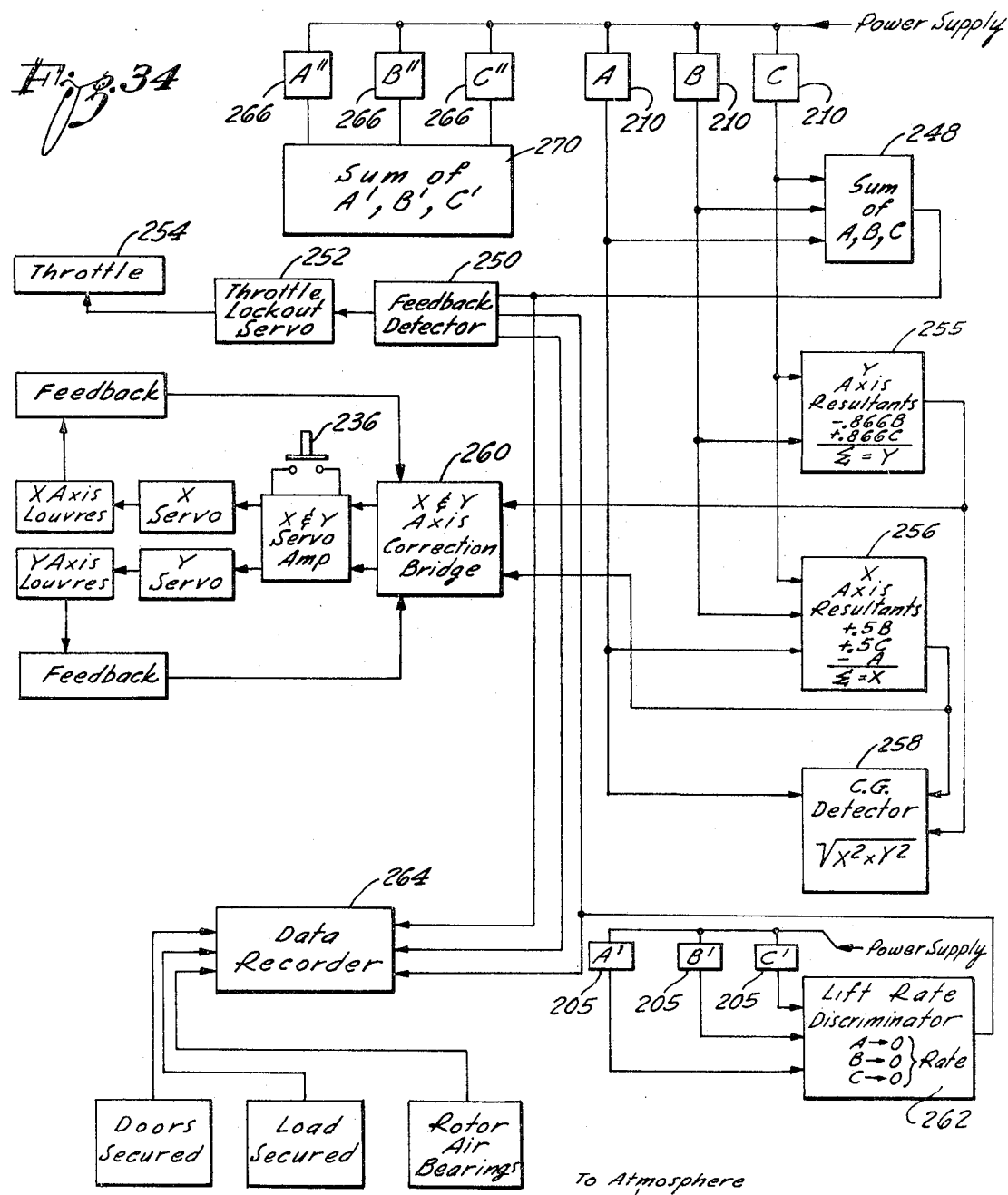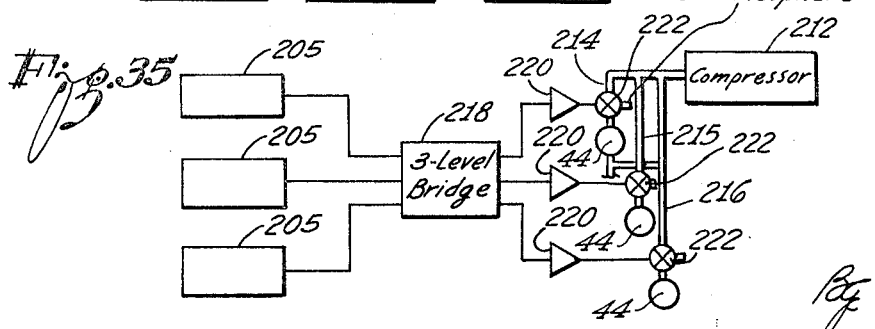

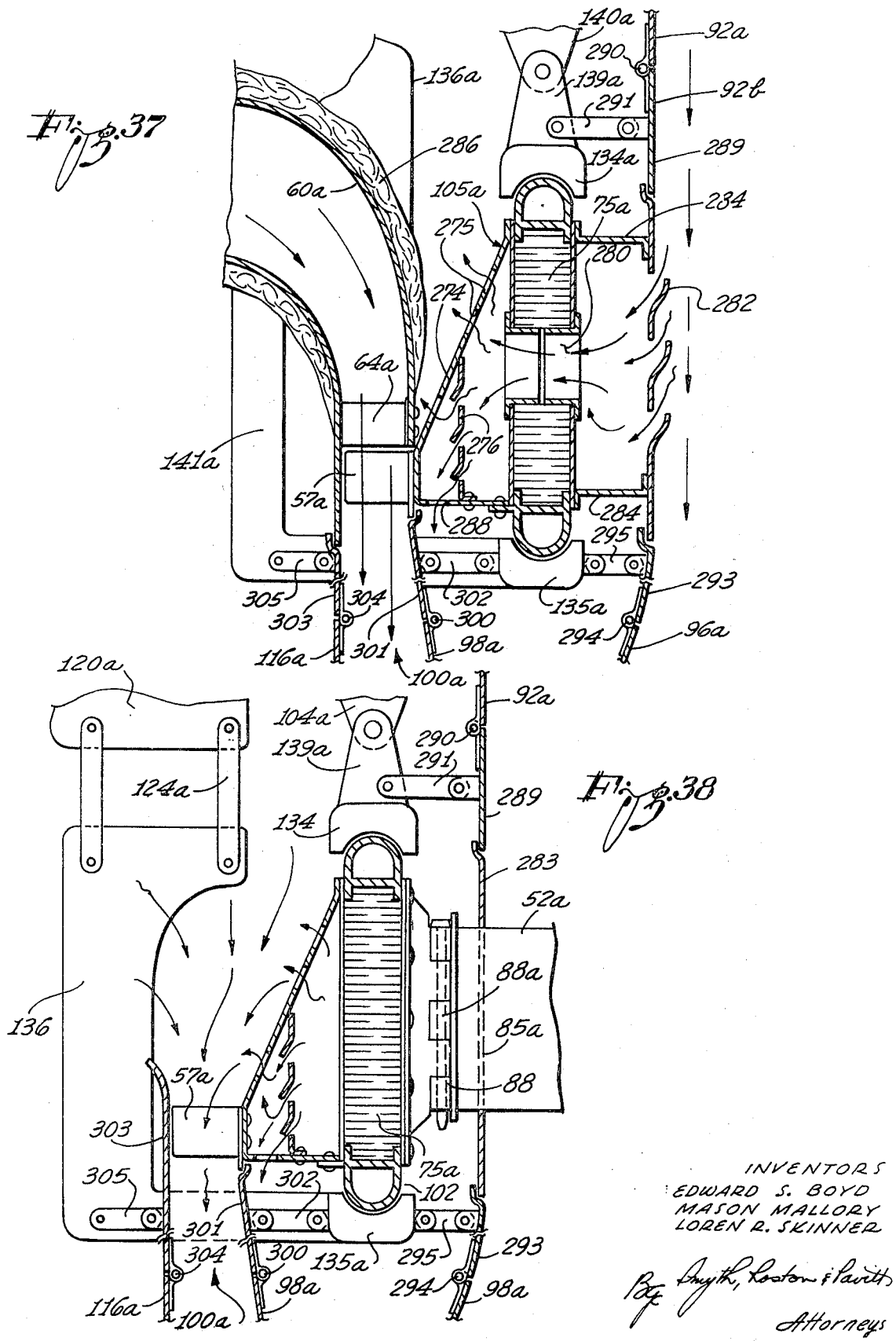

United States Patent Office 3,519,224
Patented July 7, 1970

3,519,224
VERTICAL TAKEOFF AND LANDING AIRCRAFT
Edward S. Boyd, Anaheim, and Mason Mallory, Torrance, Calif., and Loren R. Skinner, Tulsa, Okla., assignors to Turbo-Circle-Wing, Inc., Beverly Hills, Calif., a corporation of California
Filed Mar. 18, 1966, Ser. No. 535,546
Int. Cl. B64c 25/32, 29/00
U.S. Cl. 244—23                              23 Claims

ABSTRACT OF THE DISCLOSURE

A circular aircraft has an outer circumferential fan-type ducted rotor mounted on air bearings and the rotor has outer circumferential turbine blades to permit the rotor to be driven by outboard gas generators. Upper radial stator blades above the rotor are adjustable to restrict the airstream through the rotor to vary the lift, the upper stator blades in the forward and rearward quadrants being adjustable differentially to control the attitude of the aircraft with respect to its pitch axis, the upper radial stator blades in the left and right side quadrants being adjustable differentially to vary the attitude of the aircraft with respect to its roll axis. In addition the aircraft has a plurality of lower radial stator blades on the fuselage below the rotor to react with the airstream from the rotor to counter the tendency of the aircraft to rotate in reaction to the rotor, at least some of the lower radial stator blades being adjustable to vary the heading of the aircraft. The lower radial stator blades at the left and right side quadrants of the rotor normally divert the airstream rearward for forward populsion of the aircraft but are reversible to divert the airstream forwad for rearward propulsion of the aircraft.

---

This invention relates to an aircraft capable of vertical takeoff and landing (VTOL) and, more particularly, relates to such an aircraft of the ducted fan type wherein lift is accomplished by a fan-type rotor, the rotor being equipped with turbine blades for actuation by high velocity gaseous jets.

The broad object of the invention is to solve the problems that must be met to embody this basic concept in a safe, efficient and economically constructed aircraft and especially the problems relating to a versatile heavy duty aircraft capable of carrying large loads.

The first problem is to arrive at a practical overall design for a heavy duty hover-type aircraft that is structurally efficient, economical to fabricate and readily adapted to different types of cargos. Generally described, the structural organization employed comprises a disk-shaped flight section or vehicle with a separate cargo section releasably suspended from its underside to permit a plurality of different types of cargo section, to be used interchangeably, for example, passenger sections for daytime use and freight sections for nighttime. Such an arrangement also permits the flight vehicles to be used alone for lifting loads such as heavy logs and heavy construction assemblies.

A subsidiary problem is to provide an advantageous disk-shaped flight vehicle for the purpose described. In this regard the invention is characterized by the concept of a rigid disk-shaped fuselage in combination with a peripheral fan-type lift rotor with all of the load carried inboard of the rotor and with a circumferential series of outboard gas generators such as turbojets applying high velocity gas streams to outer turbine blades on the rotor.

Simplicity and high structural efficiency for the disk-shaped fuselage at low fabrication cost are achieved by employing a statically determinate circular frame structure in which compression stresses in a set of radial beams and panels are balanced by tension stress in a ring beam that interconnects the outer ends of the radial beams and panels. In the preferred embodiment of the invention, this circular frame is slightly upwardly convex to provide the advantages of a shallow dome or shallow conical configuration. Preferably each radial beam and panel is paired with a diametrically opposite radial beam and panel, each diametrical pair of radial beams, in effect, constituting a structurally efficient truss.

Exceptional rigidity and stability in the circular frame are assured, first, by incorporating a rigid cylindrical ring just inboard of the lift rotor and, second, by incorporating aluminum modules of honeycomb construction in the segmental spaces of the frame. Heavy loads will be distributed throughout the frame of such a self-contained circular fuselage structure with no frame elements whatsoever functioning under cantilever flexure. The mass of such a fuselage may be relatively low with the payload correspondingly increased.

Another problem to be met is to journal such a large diameter lift rotor on the circular fuselage. The whole load carried by the fuselage must be transmitted to the rotor along its extensive circumference with exceedingly low total friction. At the same time proper provision must be made for substantial expansion and contraction of the rotor caused by thermal changes and even greater expansion and contraction caused by centrifugal force ranging from zero magnitude to very high magnitude.

Briefly stated, this last problem is solved, in part, by employing a rotor comprising an inner circumferential cylindrical rotor ring and an outer circumferential rotor ring interconnected by lift blades in an articulated manner and, the problem is solved in further part by employing low friction air bearings for both of the cylindrical rotor rings with the air bearings floatingly mounted to follow expansion and contraction of the rotor rings. With the lift blades pivotally interconnecting the two cylindrical rotor rings and inclined in plan from radial directions, the rotor assembly permits expansion and contraction of the two cylindrical rotor rings independently of each other with any differential accommodated by slight changes of the angles in plan of the interconnecting lift blades.

An important advantage of the dual-ring articulated lift rotor is that the load transmitted to the rotor through the aid bearings is distributed around the circumference of two rotor rings instead of one rotor ring with consequent reduction of the unit loading on the bearings. Another advantage is that each of the lift blades is supported at both ends instead of being a flexurally stressed cantilever blade. With the lift rotor actuated by hot gaseous jets directed against turbine blades on its outer circumference, the rotor is the only moving part of the whole lift mechanism.

With a number of circumferentially spaced turbojets, for example six turbojets, acting on the rotor simultaneously, the problem arises of providing turbine blades capable of prolonged operation at elevated temperatures. This problem is met by providing cooling zones wherein cooling air diverted from the lift rotor is applied to the turbine blades, the turbine blades entering a cooling zone immediately after passing through each heating zone. Such an arrangement keeps the temperature of the blades relatively low to permit the turbine blades to be made of desirable metals that otherwise could not be used.

Directional control of the described aircraft is accomplished by adjustable deflector stator vanes in the annular slip stream immediately below the lift rotor. At the same time flight control with respect to the roll and pitch axes is carried out by adjustable stator vanes in the annular intake airstream immediately above the lift rotor.

These upper stator vanes are adjustable selectively for local variation in the lift exerted in different quadrants of the circular vehicle and may be operated differentially to shift the center of lift of the aircraft.

A safety problem arises of insuring that the aircraft is not overloaded on takeoff and of appropriately adjusting the upper stator vanes before takeoff in accord with the distribution of the cargo. Insurance must be provided that the center of lift substantially coincides with the center of gravity of the aircraft as required for stability and for vertical rise on takeoff. If this requirement is not met, the aircraft may tip over or veer off in harzardous manner when a takeoff is attempted. This safety problem is met by providing a sensing system to detect the location of the center of gravity prior to takeoff in combination with automatic means to trim the upper adjustable stator blades accordingly in response to signals from the sensing system.

In the preferred embodiment of the invention, the flight vehicle is supported by three extensible legs that straddle the cargo section and are adapted to measure the individual loads imposed thereon. From the three load readings the total load on the aircraft is computed and compared to a safe limit for the particular aircraft. The eccentricity or offset of the center of gravity from the geometrical center of the rotor is automatically computed and compared to the maximum permissible eccentricity for the aircraft. At the same time the exact location of the center of gravity is computed for determining the desired location of the center of lift.

In the preferred safety system, the throttle is automatically locked against operation if the total load is excessive or if the center of gravity is too far from the geometrical center, and, in addition, means is provided to prevent takeoff if the cargo is not secured, if the doors are not latched and if there is insufficient compressed air available for the air bearings. For further safety, the sensing system detects the relative loading on the three legs as the legs initially extend on takeoff thereby to detect any error in the location of lift during the transition period in which the load shifts from the legs to the rotor. If error exists the throttle is automatically closed to prevent completion of the takeoff.

The above features and advantages as well as other features and advantages of the invention may be understood by reference to the following detailed description and the accompanying drawings that illustrate the presently preferred embodiment of the invention.

In the drawings, which are to be regarded as merely illustrative:

FIG. 1 is a perspective view from above of the preferred embodiment of the aircraft;

FIG. 2 is a perspective view from below of the aircraft;

FIG. 3 is a perspective view showing the flight vehicle elevated from a complementary cargo section that is adapted for carrying passengers;

FIG. 4 is a fragmentary side elevational view of one of the three legs of the flight vehicle showing transducer means employed therewith to provide data pertinent to safe takeoff of the aircraft;

FIG. 5 is a somewhat diagrammatic plan view, partly in section, of the flight vehicle showing the disposition of the outboard turbojets;

FIG. 6 is a diagrammatic plan view, partly in section, of a rearward turbojet with two exhaust ducts for alternate use;

FIG. 9 is an enlarged fragmentary perspective view, partly in section, showing a portion of the rotor and the associated sets of stator vanes and further showing how a turbojet is positioned relative to the turbine blades of the rotor;

FIG. 10 is a fragmentary radial section of the aircraft that also shows the rotor, associated stator blades and the position of a turbojet relative to the turbine blades of the rotor;

FIG. 11 is a fragmentary plan view partly in section showing the same structure as depicted in FIGS. 9 and 10;

FIG. 12 is a radial sectional view showing the cooling action in a cooling zone;

FIG. 13 is a similar radial sectional view showing the turbine action in a hot zone;

FIG. 14 is a fragmentary section along the line 14—14 of FIG. 9 showing the exhaust manifold of a turbojet and associated turbine blades of the lift rotor;

FIG. 15 is a diagrammatic view showing how the air bearings for the rotor are floatingly mounted;

FIG. 16 is a diagram in plan of the annular lift zone for reference in describing FIGS. 17 to 20;

FIG. 17 is a diagrammatic elevational view as seen along the line 17—17 of FIG. 16, showing the relationship of the upper and lower stator blades to the lift blades of the rotor at the leading quadrant of the aircraft;

FIG. 18 is a similar view as seen along the lines 18—18 of FIG. 16 showing the relationship of the upper and lower stator blades to the lift blades of the rotor at the left quadrant of the aircraft;

FIG. 19 is a similar view as seen along the lines 19—19 of FIG. 16 showing the relationship of the upper and lower stator blades to the lift blades of the rotor at the right quadrant of the aircraft;

FIG. 20 is a similar view as seen along the lines 20—20 of FIG. 16 showing the relationship of the upper and lower stator blades to the lift blades of the rotor at the trailing quadrant of the aircraft;

FIG. 21 is a diagram showing how the upper stator vanes that are adjustable are grouped in each of the four quadrants;

FIG. 22 is a similar view showing how the lower stator vanes that are adjustable are grouped in each of the four quadrants;

FIG. 23 is a diagrammatic view showing an aircraft on the ground with the cargo distributed in a nonuniform manner to offset the center of gravity from the geometrical center of the aircraft;

FIG. 24 is a similar diagram showing the effect of attempting a takeoff with the center of lift at the geometrical center and with the center of gravity offset from the geometrical center;

FIG. 25 is a similar view showing how a vertical takeoff results from correctly shifting the center of lift to coincide with the offset center of gravity;

FIG. 26 is a diagrammatic sectional view showing an upper air bearing cooperating with the upper rim of a rotor ring;

FIG. 27 is a similar view showing how the air bearing rocks to accommodate a radial shift in the position of the rotor ring;

FIG. 28 is an enlarged perspective view of an upper air bearing and associated components;

FIG. 29 is a bottom view of the gas bearing of FIG. 28;

FIGS. 30 and 31 are diagrammatic views showing how the upper stator vanes may be adjusted to create local variation in the lift exerted by the rotor;

FIG. 32 is a diagram illustrating the mathematical relationships among the loads imposed on the three legs of the aircraft;

FIG. 33 is a diagram of a display in the control cabin indicating conditions at the time of takeoff;

FIG. 34 is a block diagram of a computer system that employs the data shown in FIG. 32 and that controls most of the display in FIG. 33;

FIG. 35 is a diagram of a control system for automatically varying the air pressure in the three legs in accord with the relative loads on the legs;

FIG. 36 is a diagrammatic view of a plurality of flight vehicles transporting a heavy load;

FIG. 37 is an enlarged sectional view of a modification of the aircraft structure relating to the rotor and rotor bearings, the view being taken in one of the outer hot zones; and FIG. 38 is a view similar to FIG. 37 but taken in an outer cooling zone.

Figure 7:
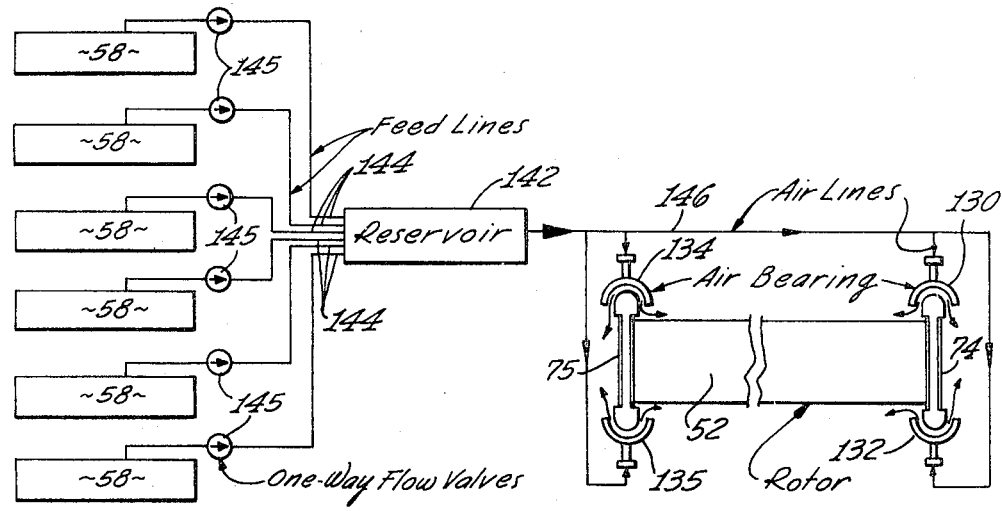
FIG. 7 is a diagram showing how compressed air is supplied to the two sets of air bearings.

In the drawings which illustrate the presently preferred embodiment of the invention, reference is made first to FIGS. 1–3 which show how the aircraft comprises an upper disk-shaped flight vehicle or section, generally designated 40, and a separate lower circular cargo section 42, the two sections being releasably interconnected so that the flight vehicle 40 may be used with a number of differet cargo sections interchangeably. The cargo section 42 is a passenger section with suitable seats and with a door 43 in the floor that may be opened to receive a flight of steps for ingress and egress. Other cargo sections may be provided, for example, cargo sections that are adapted for carrying freight. If desired, a flight vehicle may be used without a cargo section, for example, a flight vehicle may be employed in the manner of a helicopter to lift heavy loads such as heavy construction assemblies. Under some circumstances a cluster of flight sections may be used, for example as shown in FIG. 36 to lift loads that are too heavy for a single flight vehicle. In this condition the relationship of the flight vehicles could be maintained by an external frame that would fix their position in relation to each other for safe operation.

In the construction shown, the flight vehicle 40 is provided with three legs 44 to support the aircraft on the ground, the three legs straddling the cargo section 42 and being of telescoped construction for extension and retraction to permit the flight section to be raised and lowered relative to the cargo section for the purpose of coupling and uncoupling the two sections. The flight vehicle 40 may have a radial control cabin 45 on its underside with the cargo section 42 formed with a corresponding radial gap 46 to receive the control cabin when the flight vehicle and cargo section are assembled together. The assembled aircraft has a circumferential series of windows 48 which includes two windows 48a of the control cabin 45.

As will be described in detail hereafter, the flight vehicle 40 has an outer circumferential lift rotor, generally designated 50 in FIG. 2, of the fan type having lift blades 52. The flight vehicle is provided with an annular series of upper stator vanes 54 overhanging the lift rotor and on its underside is further provided with a second lower set of stator vanes 55, the upper set of stator vanes being employed to control the attitude of the aircraft with respect to roll and pitch axes, the second lower set of stator vanes being employed for directional control.

The lift rotor 50 may be suitably actuated in the manner of a turbine rotor, for example by means of a series of circumferentially spaced gas generators in the form of turbojets 56 in FIG. 5 positioned outboard of the rotor and adapted to direct high velocity hot gaseous streams against turbine blades 57 in FIGS. 11, 14 and 37 on the outer circumference of the rotor. An important advantage of this arrangement is that in a large heavy-duty vehicle the rotor is of relatively large diameter with a high peripheral speed. The high velocity of the turbine blades 57 is conducive to efficient transmission of power to the rotor by the high velocity gaseous stream from the turbojets. As best shown in FIGS. 6, 9 and 11, each turbojet has an air intake duct 58 and an exhaust manifold 60, the intake duct being connected to the body of the turbojet by a flexible duct 62 and the exhaust manifold being formed with a series of deflectors 64 (FIG. 14) for directing the hot gases against the turbine blades 57.

As best shown in FIG. 5, the fuselage of the flight vehicle 40 may incorporate a circular frame comprising a series of circumferentially distributed radial beams 65 and a ring-shaped beam 66 interconnecting the outer ends of the radial beams. The inner ends of the radial beams are suitably interconnected, for example by an inner ring 68 of polygonal configuration. It is contemplated that the radial beams 65 will be preloaded under longitudinal compression with the compression stresses of the radial beams balanced by tension stress in the outer ring 66.

In the preferred embodiment of the invention the radial beams 65 incline upward towards the inner ring 68 at low angles so that the circular framework has an overall upwardly convex conical configuration which is of the character of a low dome. It is further contemplated that each radial beam 65 will be matched by a diametrically opposite radial beam so that the radial beams are arranged in diametrical pairs, each pair being functionally equivalent to a triangular truss with the ring 68 forming the peak of the truss.

For rigidity and stability under loads the circular fuselage frame preferably further includes a downwardly extending cylindrical ring 70 indicated in FIGS. 9, 10 and 11 which extends downward from the radial beams 65 and interconnects the radial beams, the cylindrical ring 70 being of substantial width or axial dimension to provide the desired rigidity. Suitable stressed structure combines with the described circular frame to complete the fuselage, the additional structure including, for example uniformly dimensioned modules 72 indicated in FIG. 5 of honeycomb aluminum construction united with the circular frame and occupying the radial segmental spaces formed by the radial beams 65. It is apparent that the circular frame is a statically determinate structure of high load bearing capability with the cantilever beams under minimum flexural centilever load. It is contemplated that the majority of the payload will be suspended from the circular frame inboard of the lift rotor.

As shown in FIGS. 9, 10 and 11, the lift rotor 50 may comprise an inner cylindrical ring 74 and an outer cylindrical ring 75 with the opposite ends of the lift blades 52 hingedly connected to the two rotor rings respectively. With the lift blades 52 inclined at substantial angles from radial positions, the two rotor rings 74 and 75 and the hingedly related lift blades 52 form an articulate rotor structure in which the inner rotor rings and the outer rotor rings are free to expand and contract independently of each other. The optimum angle at which the lift blades 52 depart from strictly radial positions in plan may be readily calculated in accord with the maximum load, the diameter of the rotor and the contemplated angular velocity of the rotor.

As best shown in FIG. 10, each of the lift blades 52 of the rotor is connected to the two rotor rings 74 and 75 in the following manner. Each of the lift blades 52 which is, of course, inclined from the vertical, is rigidly connected at its inner end to an inner end plate 84 and is rigidly connected at its outer end to an outer end plate 85. The inner end plate 84 is connected to the inner rotor ring 74 by a hinge 86, and in like manner, each outer end plate 85 is connected to the outer rotor ring 75 by a hinge 88. The inner end plates 84 are releasably interconnected to form a continuous series around the circumference of the rotor 50 adjacent the inner rotor ring 74 and in like manner the outer end plates 85 are releasably interconnected adjacent the outer rotor ring 75. It is apparent that removal of the hinge pins from the two opposite hinges releases what may be termed a lift blade unit comprising a lift blade and two end plates.

The circumferential series of inner end plates 84 and the circumferential series of outer end plates 85 form portions of an annular air duct, generally designated 90 in FIG. 10, through which flows the annular airstream created by the rotor 50. The inner circumferential surface of the annular air duct 90 is continued by a fixed circular wall 92 extending upward from the region of the inner end plates 84 and by a fixed flared circular wall 94 that extends downward from the region of the inner end plates. In like manner the outer circumferential surface of the annular air duct 90 is continued by a fixed circular wall 95 extending upward from the region of the outer end plates 85 and by a fixed flared circular wall 96 extending downward from the outer end plates.

United with and supported by the lower fixed flared circular wall 96 is a flared wall 98 which forms the inner circumferential surface of an annular exhaust duct that is generally designated 100 in FIG. 10, the exhaust duct being used for exhausting the hot gases from the turbojets as well as for cooling air in a manner described hereafter.

It is contemplated that each of the inner and outer rotor rings 74 and 75 will be of aluminum honeycomb modules interconnected end to end with continuous rails on the upper and lower rims of the rings. FIGS. 26 and 27 show how a rail 102 for an upper or lower rim of a rotor ring 74 or 75 may be of hollow construction with flanges 104 integral with the rotor rings.

As shown in FIGS. 10, 12 and 13 the outer rotor ring 75 is provided with an outer circumferential hollow structure, generally designated 105 and the previously mentioned turbine blades 57 are releasably mounted on the outer circumference of this structure. The hollow structure is preferably made in sections for freedom for radial expansion and contraction in accord with radial expansion and contraction of the rotor ring.

As indicated in FIG. 5 the outer circumferential region of the vehicle is divided into alternate hot zones and cooling zones. The hot zones are in the regions of the various exhaust manifolds 60 and the cooling zones are in the regions of the intake ducts 58 and the spaces between the successive turbojets.

The arrows in FIG. 12 indicate how cooling air created by the rotor 50 flows to the turbine blades 57 in each of the cooling zone. As shown in the drawing, the outer end plates 85 of at least some of the lift blades 52 are provided with short inclined tubes 106 which may be made of flexible material and which extend through the outer rotor ring 75 into the interior of the hollow structure 105. The hollow structure 105 is formed with outer windows 108 to direct the cooling air to the upper sides of the turbine blades for flow past the turbine blades into the annular exhaust duct 100.

This arrangement whereby the turbine blades 57 are cooled extensively after each exposure to the hot gases from a turbojet makes it possible to use less expensive materials for the turbine blades that would fail if operated at the elevated temperature of the hot gases. Thus the cooling arrangement makes it possible to use turbine blades made of materials like titanium.

As indicated in FIGS. 10, 12 and 13, the turbojets 56 are enclosed by a cowling 112 that is continuous around the outer circumference of the flight section of the aircraft. The cowling 112 is made in sections supported by a series of concealed radial frames, the individual sections of the cowling being removable for access to the turbojets and to permit convenient replacement of the turbojets. FIGS. 10, 12 and 13 show frames 114, 115 and 116 respectively. The various frames support a fixed flared circular wall 117 which is the outer circumferential wall of the previously mentioned exhaust duct 100.

Since the outer rotor ring 75 must be free for radial expansion and contraction, the exhaust mainfolds 60 of the turbojets 56 must be free for corresponding radial movement. For this purpose each of the turbojets 56 is yieldingly mounted to follow the radial expansion and contraction of the outer rotor ring 75. Thus each of the turbojets 56 may be yieldingly suspended from a pair of fixed overhead support arms shown in FIGS. 9, 10 and 11 that are spaced apart circumferentially of the vehicle and extent parallel outward from the previously mentioned ring-shaped beam 66.

FIG. 10 shows one of the two overhead support arms 120 for a turbojet 56. The turbojet 56 has fixed transverse webs 122 corresponding to the two overhead arms 120 and each overhead arm is connected to the corresponding transverse web by a pair of equal parallel links 124. This arrangement permits each turbojet to swing outwardly and inwardly relative to the lift rotor 50.

The air intake ducts 58 of the turbojets have upper intake ports 125 that are open to the exterior of the cowling 112 as shown in FIG. 11. The air intake ducts may be fixedly supported by frames 115 and fixed brackets 126. The previously mentioned flexible ducts 62 are employed to interconnect the turbojets 56 and the fixed air intake ducts 58 to avoid interference with the floating action of the turbojets.

Preferably each turbojet 56 is shielded to prevent any fragments from penetrating the fuselage or cargo section in the event of failure of a turbojet. For this purpose each turbojet 56 may be provided with a curved scatter shifted on its inner longitudinal side as indicated in FIG. 9.

As shown diagrammatically in FIG. 7, the inner rotor ring 74 is confined by circumferentially spaced upper bearings 130 in coperation with circumferentially spaced lower bearings 132 and the outer rotor ring 75 is confined by a series of circumferentially spaced upper bearings 134 in cooperation with spaced lower bearings 135. As shown in FIGS. 26 and 27 the rails 102 with which the bearings cooperate are shaped with a cylindrical toroid surface and the bearings are in the form of shoes of complementary configuration whereby the shoes may rock, for example from the position shown in FIG. 26 to the position shown in FIG. 27, without exceeding air bearing tolerance with the rail.

Since the only load placed on the lower bearings 132 and 135 is the weight of the rotor when the aircraft is idle, the lower bearings are fewer in numbers than the upper bearings. Since the inner and outer rotor rings 74 and 75 must be free to expand and contract, the various bearings 130, 132, 134 and 135 must be floating bearings in the sense of being capable of shifting with the radial expansion and contraction of the rotor rings. Upper bearings 130 and 134 and lower bearings 132 may be individually pivotally supported and the lower bearings 135 may be supported by lower webs 136 that are an extension 122 or are fixedly carried by the turbojets 56, all as indicated in FIG. 10.

The upper bearings 130 for the inner rotor ring 74 have integral ears by means of which they are pivotally suspended from brackets 137 that are mounted on the previously mentioned cylindrical ring 70 of the fuselage frame and in like manner the lower bearings 132 have integral ears by means of which they are pivotally connected to lower brackets 138 on the cylindrical ring. In a similar manner the upper bearings 134 for the outer rotor ring 75 have relatively long ears 139 by means of which they are pivotally suspended from corresponding brackets 140 on the underside of the ring-shaped beam 66 of the fuselage frame. It is apparent that the bearings 130, 132 and 134 are free to rock about their pivot axis as necessary to accommodate expansion and contraction of the rotor rings 74 and 75.

As shown diagrammatically in FIG. 15, the effective length of the parallel links 124 by which the turbojets 56 are yieldingly suspended from the overhead arms 120 is the same as the effective length of the ears 139 of the upper bearings 134. By virtue of this relationship, the arcuate path of the turbojet 56 as it swings outwardly and inwardly with expansion and contraction of the outer rotor ring 75 is the same as the arcuate path of the corresponding upper bearings 134. Each lower bearing 135 that is unitary with a turbojet 56 follows the same arcuate paths as the upper bearings 134. Thus the upper and lower bearings 134 and 135 maintain constant relationship to the outer rotor ring 75. Additional lower bearings 135 carried by special yokes 141 (FIG. 13) which are suspended may be from overhead arms 120 by parallel links 124 in the same manner as the turbojets.

In the preferred practice of the invention the various bearings 130, 132, 134 and 135 are air bearings which are supplied with compressed air from a suitable source. In this regard a feature of the invention is the concept that the air may be supplied by the final compression stages of the various turbojets 58. For this purpose, as indicated in FIG. 7 the compression stages of the turbojets 56 are connected to a common compressed air reservoir 142 through individual air lines 144, the air lines being provided with check valves 145. The reservoir 142 is connected to the various air bearings by supply lines 146.

Each of the air bearings may be of the construction of an upper air bearing 130 shown in FIGS. 28 and 29, wherein the air bearing is equipped with an inner liner 147 of suitable anti-friction plastic material such as polytetrafluoroethylene. For cooperation with such a liner the rails 102 may be coated or impregnated with polytetrafluoroethylene or the like. The toroidal inner surface 148 of the liner 147 of the air bearing 130 conforms with the cylindrical toroidal curvature of the previously mentioned rotor rails 102. The inner surface 148 of the polytetrafluoroethylene liner 147 is provided with a pair of parallel longitudinal grooves 150 which are interconnected by two transverse end grooves 152 and also by a central transverse groove 154. Compressed air is continuously supplied to the pattern of grooves by a nipple 155 which communicates with a central port 156 in the central groove 154. It is apparent that the continuously supplied compressed air will form a thin film of air cushion between the bearing and the rotor rail 102 in a well known manner.

Each nipple 155 may be provided with an automatic cutoff valve 158 as shown in FIG. 28. The automatic cutoff valve has a hollow chamber through which the compressed air normally flows and a leaf spring 160 overlies the outlet port 162 of the chamber. At a relatively low normal rate of air flow, the leaf spring 160 is bowed away from the outlet port 162 to provide adequate flow clearance. In the event that failure of the bearing or of the nipple 155 releases the compressed air to the atmosphere, however, the air flowing at an excessive rate impinges on the leaf spring 160 and forces the leaf spring to close the outlet port.

A certain problem arises in that compressed air must be available for the various air bearings prior to takeoff and starting of the turbojets for this purpose prior to takeoff may cause the lift rotor to rotate without the presence of air in the bearings. This problem is solved by using only the two rearmost turbojets to supply compressed air to the reservoir 142 prior to takeoff and by providing means to divert the exhaust of the rearmost turbojets from the turbine blades. The diversion of the hot gases to the atmosphere also voids the possibility of overheating the turbine blades 57 before they are rotating. As shown in FIGS. 1, 3 and 5, two suitably rearwardly directed exhaust ducts 164 are provided to discharge the hot gases from the two rearmost turbojets directly into the atmosphere.

As shown in FIG. 6 a suitable remotely controlled baffle or gate 165 may be hinged at 166 to swing between a normal position and a second position. At the normal position shown in FIG. 6 the exhaust gases are directed in the normal manner into the exhaust manifold 60 of the turbojet for driving the lift rotor 50. When the gate 165 is swung to its second position indicated in dotted lines, the gases generated by the turbojets are diverted into the alternate exhaust duct 164. One advantage of the arrangement is that when the two rearmost turbojets can be spared, i.e. when the remaining turbojets are adequate for effective actuation of the lift rotor under certain circumstances, the rearmost turbojets may exhaust into the rearwardly directed exhaust ducts 164 for jet propulsion force to boost the forward travel of the aircraft.

Figure 8:
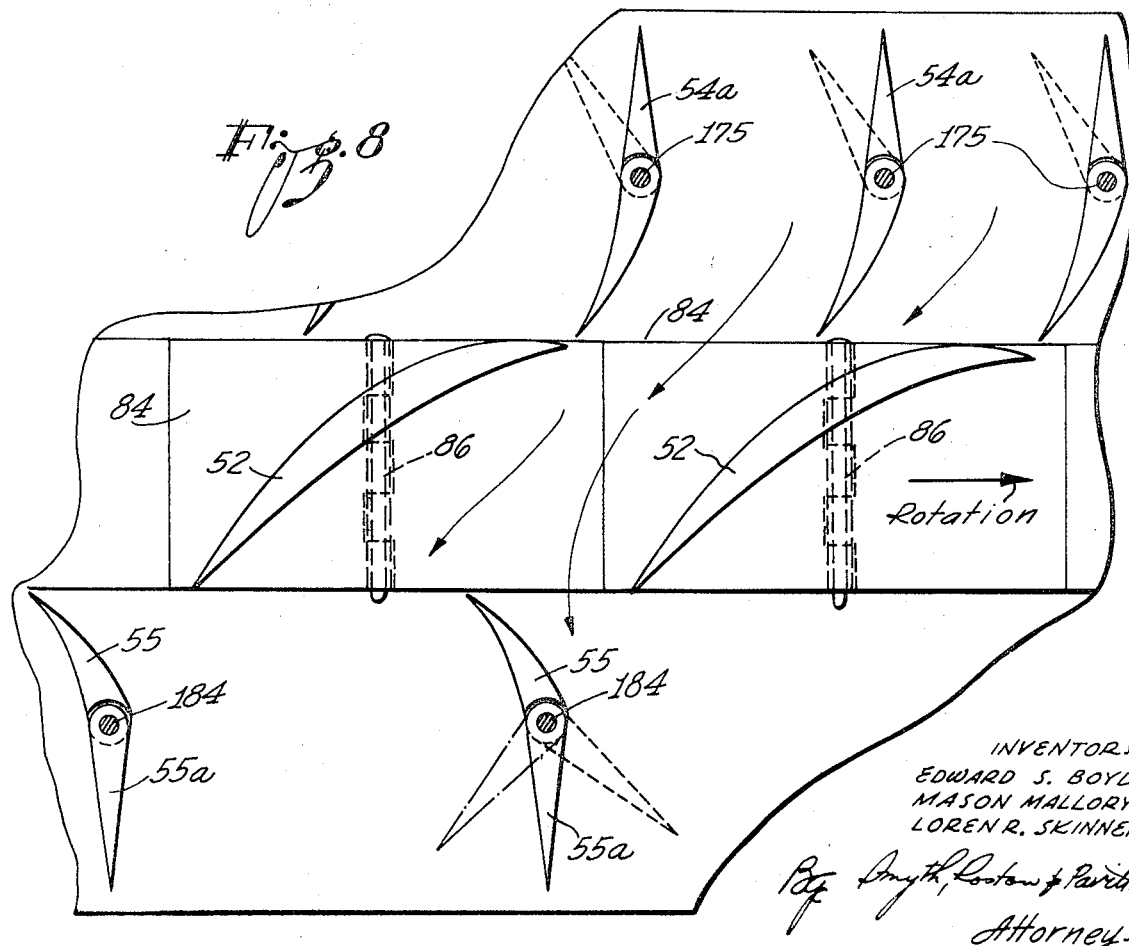
FIG. 8 is an enlarged diagrammatic view showing the relation between the lift blades of the rotor and the two sets of adjustable stator vanes that are mounted, respectively, above and below the rotor.

As best shown in FIG. 10 the upper stator vanes 54 are mounted in the upper portion of the annular air duct 90 above the lift blades 52 and the lower stator vanes 55 are mounted in the lower portion of the annular air duct below the lift blades of the rotor shown in FIG. 2. FIG. 8 shows diagrammatically how the two sets of stator vanes are related to the lift blades 52 of the rotor.

FIG. 16 is a diagrammatic plan view of the annular lift zone provided by the lift rotor 50 and FIGS. 17, 18, 19 and 20 are various diagrammatic sectional views of the lift blades 52 and the associated stator vanes 54 and 55 at four spaced points around the circumference of the vehicle.

At the leading end of the vehicle in flight the upper halves of the upper stator blades 54 are substantially perpendicular to place them in planes parallel to the direction of the movement of the ambient atmosphere relative to the aircraft and the lower halves of the upper stator blades are inclined as shown to divert the incoming air towards the undersides of the rotating lift blades 52. As shown in FIG. 20, the upper stator blades 54 are of the same configuration as at the trailing end of the aircraft.

On the right side of the flying vehicle the upper halves of the upper stator blades 54 lean into the relative airstream as shown in FIG. 19 with the lower halves of the upper stator vanes positioned to divert the airstream towards the undersides of the lift blades 52. As shown in FIG. 18 the upper halves of the upper stator blades 54 on the left side of the vehicle lean into the relatively moving airstream while the lower halves as usual divert the air towards the undersides of the lift blades 52. Thus the upper stator vanes 54 on the right side of the aircraft are approximately straight in cross section while the upper stator blades 54 on the left side of the aircraft are somewhat V-shaped.

The upper stator blades 54 form a continuous series around the circumference of the aircraft with the upper halves of the stator blades progressively changing in inclination. Thus in the sequence of upper stator blades extending from the leading end of the aircraft to the left side of the aircraft, the configuration of the upper stator blades in general progressively changes from the configuration shown in FIG. 17 to the configuration shown in FIG. 18. In like manner the configuration of the upper stator blades changes progressively from the configuration shown in FIG. 18 at the left side of the aircraft to the configuration shown in FIG. 20 at the rear of the aircraft. From the trailing end of the aircraft to the right side of the aircraft, the configuration of the upper stator vanes progressively changes from the configuration shown in FIG. 20 to the configuration shown in FIG. 19 and from the right side of the aircraft to the leading end of the aircraft the configuration of the upper stator vanes changes progressively from the configuration shown in FIG. 19 to the configuration shown in FIG. 17.

For the purpose of trimming the aircraft in flight or for controlling the attitude of the aircraft with respect to the roll and pitch axes, groups of the upper stator vanes 54 are made adjustable for adjustment by remote control. The adjustable upper stator vanes as distinguished from the remaining fixed upper stator vanes may be conveniently termed louvers since they function in the manner of adjustable louvers. As indicated diagrammatically in FIG. 21 the adjustable louvers include a forward group 168 in the forward quadrant of the aircraft, a left group 170 in the left quadrant of the aircraft, a rear group 172 at the trailing quadrant of the aircraft and a right group 174 in the right quadrant. As best shown in FIG. 8 each of the louvers or adjustable stator vanes 54 has its upper half 54a hingedly mounted for rotation by remote control about the axis of a cross rod 175, the cross rod being indicated in dotted lines in FIG. 10.

Normally the louvers are adjusted for near maximum intake airflow to the rotor. For example, the louvers of the forward group 168 are normally adjusted somewhat as indicated in FIG. 31 for near maximum local lift by the rotor. The upper half of the louvers may be adjusted to restrict the airstream to various degrees for the purpose of locally reducing the lift to various degrees. Thus when the louvers shown in FIG. 31 are adjusted as shown in FIG. 30 the louvers restrict the amount of air flowing to the rotor and thus locally reduce the lift effect of the rotor.

It is apparent that the louvers of the forward and rearward groups 168 and 172 may be adjusted differentially to control the attitude of the aircraft with respect to the pitch axis and the leftward and rightward groups 170 and 174 may be adjusted differentially to control the attitude of the aircraft with respect to its roll axis. It is also apparent that the louvers may be adjusted to compensate for unsymmetrical loading of the aircraft, i.e. to shift the center of lift to coincide with the center of gravity when the center of gravity is offset from the geometrical center of the rotor.

One function of the lower stator vanes 55 is to oppose the tendency of the aircraft to rotate in reaction to the gaseous jets applied to the turbine blades 57 of the lift rotor 50. For this purpose the lower stator vanes are arranged to deflect the slip stream from the rotor in such manner as to convert the helical flow of the annular air stream into axial flow.

A second function of the lower stator vanes 55 is to control the heading of the aircraft as well as any tendency of the aircraft to drift laterally in a cross wind. For this purpose groups of the lower stator vanes are made adjustable in the previously mentioned four quadrants. Thus as indicated in FIG. 22, a group 176 of the lower stator vanes is adjustable in the forward quadrant, a group 178 is adjustable in the left quadrant, a group 180 is adjustable in the trailing quadrant and a group 182 is adjustable in the right quadrant. For the purpose of adjustment, the adjustable lower stator vanes 55 may be constructed as shown in FIG. 8, the lower halves 55a of the stator vanes being pivoted on cross rods 184 through the range of angles indicated in dotted lines, one of the cross rods being indicated in FIG. 10.

If the direction of travel of the flying vehicle is to be reversed, the lower stator vanes of the left group 178 and the right group 182 are reversed, i.e. the lower halves of the lower stator vanes are swung forward to divert the slip stream forward and thereby propel the aircraft rearward. A change in heading may be accomplished in various ways. For example, the rearward group 180 of stator vanes may be adjusted to create a turning moment or the forward and rearward groups 176 and 180 may be operated differentially to create a stronger turning moment. The turning moment may also be created by reversing the lower stator halves in one of the two lateral groups 178 and 182.

As heretofore stated the safety problem arises of assuring that the aircraft is not overloaded on takeoff and of further assuring that the center of lift substantially conincides with the center of gravity when the aircraft takes off to avoid the possibility that the aircraft will either tip over or veer away in a hazardous manner. In this regard an important feature of the invention is the employment of the three legs 44 of the aircraft as means to sense both the total load and the location of the center of gravity prior to takeoff. Combined with this sensing arrangement is a suitable safety system incorporating automatic means to trim the aircraft by adjustment of the louvers in accord with the detected location of the center of gravity.

Each of the three legs 44 may be of the construction shown in FIG. 4 wherein each leg comprises an expansible pneumatic chamber formed by an upper cylinder 200 and a lower cylinder 202 that slidingly telescopes into the upper cylinder. The lower cylinder 202 may be provided with a stop collar 204 to abut the lower end of the upper cylinder at the limit of contraction of the leg. Each leg contains a body of compressed air so that the leg functions in effect as an air spring. The length or degree of extension of the leg varies inversely with the load and the pressure of the confined body of air varies directly with the load.

The degree to which the leg 44 is extended or retracted may be sensed by suitable transducing means which may take the form of a potentiometer. In FIG. 4, a potentiometer coil 205 in a suitable casing is mounted on the upper cylinder 200 and a wiper or movable contact (not shown) for cooperation with the coil is mounted on a rod 206 that telescopes into the coil, the rod being anchored to the lower cylinder 202 by a collar 208. Thus the potentiometer creates a voltage signal that varies with the degree to which the leg is extended or contracted. The air pressure in the leg may be sensed by a suitable pressure transducer 210 which delivers a voltage signal that varies with the pressure.

FIG. 35 shows diagrammatically how a suitable compressor 212 may be connected to three tubes 214, 215 and 216 which, in turn, are connected to the three legs 44 respectively for supplying compressed air to the legs automatically as may be necessary to equalize the pressure in the three legs in the course of the loading of the aircraft with cargo or passengers.

In FIG. 35, the three potentiometers 205 on the three legs respectively are connected to a three-level bridge 218. Each level of the bridge 218 is connected to a corresponding power amplifier 220 which regulates a corresponding 3-way electric servo valve 222 in a corresponding pipe 214, 215 or 216. When the voltages delivered by the three potentiometers 205 to the three levels of the bridge 218 match the reference voltage, all of the valves 222 are closed. If however, any of the legs is contracted or extended more than the position established in response to the reference voltage, the three-level bridge 218 sends a signal to cause the corresponding valve 222 to open to admit air from the compressor or bleed air to the atmosphere until all of the legs are equal length. Thus the system shown in FIG. 35 functions automatically to keep the three legs equally extended. With the three legs equally extended, the loads on the three legs respectively will be indicated by the air pressure in the three legs, the three pressure transducers 210 producing voltages corresponding to the respective loads.

The manner in which the loads imposed on the three legs respectively may be used to compute the location of the center of gravity as well as the radial distance of the center of gravity from the geometrical center of the rotor 50 may be understood by reference to FIG. 32. The three legs 44 are spaced 120 degrees apart and the loads on the three legs as detected by the three pressure transducers 210 are designated A, B and C, respectively. The calculations involved are based on a rectangular coordinate system in which the X and Y axes intersect at the geometrical center of the aircraft, the leg that bears the load A being on the Y axis as shown. It is apparent that the total weight of the aircraft or total load to be lifted is indicated by the sum of the analog voltages A, B and C. It is also apparent from the tabulation in FIG. 32 that the radial distance or offset of the center of gravity from the center of the rotor equals $\sqrt{Y^2+X^2}$ and that the exact location of the center of gravity may be readily computed.

FIG. 33 shows, by way of example, a display on the pilot's instrument board that may be provided in a suitable safety system relating to preparation for takeoff. If the doors are properly secured, a green lamp 224 lights up but if the doors are not latched a red lamp 225 lights up. If the load is secured, i.e. if the tying down of the cargo has been checked or if the seat belts have been checked, a green lamp 226 is energized but otherwise a red lamp 228 lights up. If the total weight as sensed by the three legs is under the permissible maximum, a green lamp 230 lights up but if the weight exceeds the safe maximum a red lamp 232 is energized. If the eccentricity of the center of gravity, i.e. the radial distance of the center of gravity from the geometrical center of the rotor is within a safe limit, a green lamp 234 is energized but if not, a red lamp 235 is energized. If, prior to takeoff, a push button 236 in FIG. 34 is pushed for automatic adjustment of the louvers or adjustable upper stator vanes 54 to place the center of lift at the center of gravity, a green lamp 238 is energized but otherwise a red lamp 240 is energized. Finally, if there is adequate pressure in the previously mentioned reservoir 142 for operation of the various air bearings, a green lamp 242 is energized, but if the air pressure is too low a red lamp 244 is energized. If any one of the red lamps 225, 228, 232, 235, 240 and 244 is energized the throttle is automatically locked at closed position to prevent takeoff.

To keep the pilot informed of changing conditions while the aircraft is being loaded, numerals in an indicator window 245 indicates the total load in terms of percentage of the maximum allowable load and numerals in a second indicator window 246 indicates the eccentricity or offset of the center of gravity in percentage of the maximum permissible offset.

FIG. 34 is a block diagram of a computing system that may be employed with the display shown in FIG. 33. The three pressure transducers 210 on the three legs 44 respectively are designated A, B and C in FIG. 34 in accord with the same designations in FIG. 32. A computer unit 248 totals the three loads imposed on the three legs 44 and transmits the total to the indicator window 245 in terms of percentage of the maximum allowable load. At the same time the computer unit 248 causes the green lamp 230 to be energized if the weight is not excessive but if the weight is excessive the computer energizes the red lamp 232. At the same time the computer unit 248 acting through a feedback detector 250 and a throttle lockout servo 252 keeps the throttle 254 locked in closed position if it is found that the aircraft is overloaded.

A computer unit 255 computes the sum of the Y axis resultants shown in the chart in FIG. 32 and a computer unit 256 computes the sum of the X axis resultants. These two calculations are transmitted to a computer unit 258 which solves $\sqrt{Y^2+X^2}$ to find the offset of the center of gravity and this solution is transmitted to the indicator window 246 as a percentage of the maximum allowable offset. At the same time the lamp 234 is energized if the offset is acceptable but the lamp 235 is energized if the offset exceeds the allowable maximum.

The two computer units 255 and 256 send their data signals with respect of the Y axis resultants and the X axis resultants to a computer unit 260 which incorporates a correction bridge to ascertain how the louvers or adjustable upper stator vanes should be adjusted to locate the center of lift in accord with the computed location of the center of gravity. The servo system in FIG. 34 for carrying out this adjustment of the louvers may be activated momentarily, when desired, by pressing the previously mentioned push button 236.

When the time arrives for take-off, the three level bridge control 218 shown in FIG. 35 is cut off from the legs. As the weight of the aircraft is progressively shifted from the three legs to the lift rotor 50 when takeoff is initiated, the three legs extend uniformly if the louvers have been properly adjusted to make the center of lift coincide with the center of gravity. Detecting the degree of uniformity of the rates of extension of the three legs is, therefore, a method of checking on the correctness of the adjustment of the louvers.

For the purpose of carrying out this checking procedure, a computer unit 262 is a lift rate discriminator which receives analog voltages A', B' and C' from the three potentiometers 205 respectively of the three designated legs. If the three legs do not extend at substantially the same rate, the computer unit 262 sends a signal to the feedback detector 250 to close the throttle 254 to prevent completion of the takeoff. As required by the FAA, the aircraft is provided with a data recorder 264 which is connected to the computing system as shown and which also receives data regarding the securing of the doors, the securing of the load and the provision of adequate pressure for the rotor air bearings.

When the aircraft is in flight, the air pressure in the upper air bearings 130 and 134 varies in accord with the load imposed on the rotor. By measuring the air pressure at selected points, variations in the loading caused by inertia during flight may be readily detected. For example, the air pressure at three points 120° apart may be obtained by providing selected air bearings with pressure transducers. FIGS. 28 and 29, for example show how a pressure transducer 266 may be added to an air bearing with the pressure transducer communicating with the confined air at an inner port 268.

When the aircraft is in flight the transducers 266 create voltage signals A'', B'' and C'' as indicated in FIG. 4 and these signals are transmitted to a computer unit 270 which calculates the total loading on the rotor and transmits the results to an indicator window 272 on the display shown in FIG. 33, the result being expressed in terms of maximum premissible load for guidance of the pilot in maneuvering the aircraft.

The operating procedure to prepare for takeoff and to initiate takeoff may be readily understood from the foregoing discussion of the safety system. The operation starts as the vehicle is being loaded with passengers or cargo. During this period the three-point load suspension system provided by the three pneumatic legs measures the air pressure required at the three points to sustain the aircraft in a level position. One result of the three measurements is transmitted to the indicator window 245 of the display panel to show the progressive increase in the magnitude of the total load in comparison to the safe maximum. If the load is below the permissible maximum the green light 230 is energized but if the load exceeds the maximum the red lamp 232 is energized. When the loading sequence is completed, the doors are closed and secured causing the red lamp 225 to go off and the green lamp 224 to go on. When all the passengers are seated and the seat belts are buckled, or when a freight cargo is secured, a signal is produced. In the case of passengers, this signal plus a "ready" indication from the stewardess causes the red lamp 228 to go off and the green lamp 226 to go on.

The pilot may now refer to the display panel to read the total static load in indicator window 245 and to read the offset of the center of gravity in indicator window 246. Assuming that the aircraft is not overloaded and that the offset of the center of gravity is not excessive, the pilot presses the push button 236 (FIG. 34) to cause the louvers to be actuated automatically for trimming the aircraft in accord with the location of the center of gravity.

The pilot turns his attention to the two rear turbojets and by remote control swings the two baffles or gates 165 out of their normal positions to their dotted positions shown in FIG. 6 to cause the two rearward turbojets to discharge their gases into the atmosphere instead of actuating the lift rotor 50. The two rearward turbojets are started and their final compression stages build up pressure in the air reservoir 142. When there is adequate pressure to supply the air bearings for the lift rotor, the red lamp 244 goes off and the green lamp 242 goes on.

By this time the aircraft is ready for initiation of the takeoff and the pilot starts the remaining turbojets and opens the throttle to cause the weight of the vehicle to be transmitted gradually from the three legs to the lift rotor. If the corrections in trim accomplished by adjustment of the upper louvers has been accurate and the center of lift is substantially over the center of gravity, the three legs will extend uniformly. If the legs do not extend uniformly it means that the louvers are not correctly adjusted and the lift rate discriminator 262 will not only turn off the green light 238 and turn on the red light 240 but will also act through the feedback detector 250 to close the throttle 254 to terminate the takeoff. The three legs 44 may be capable of about four feet of extension, this range being sufficient for the purpose of checking the trim when take off is initiated. If the take off is terminated the air bodies in the three legs serve to cushion the lowering of the vehicle to its original level.

Once the aircraft is in free flight, the indicator window 272 controlled by computer unit 270 indicates the total load on the lift rotor and in the absence of inertia the total load should read approximately the same as the static load prior to takeoff. The flight load varies as the aircraft is accelerated upward or downward and this information is useful to enable the pilot to avoid overstressing the aircraft.

The flight load percentage displayed at indicator window 272 is also highly useful when a plurality of the flight vehicles 40 are grouped to lift a common heavy load as shown diagrammatically in FIG. 36. The flight load values for the various flight vehicles may be transmitted to a control cabin on one of the flight vehicles where a master pilot can issue orders to the other pilots to regulate the loads distributed among the flight vehicles. If desired, all of the flight load readings of the various vehicles may be displayed simultaneously in the control cabin of each vehicle for guidance of each pilot in maneuvering his aircraft to sustain a predetermined portion of the total load.

The described aircraft construction minimizes maintenenace costs because the rotor is the only moving part and it is made of uniform interchangeable sections that may be quickly and conveniently replaced whenever desirable. With the outer circumferential cowling made up of removable sections, the turbojets and the rotor are fully accessible for inspection and repair. With maintenance cost drastically reduced, the cost per passenger mile drops to an economical level that is not attainable in conventional VTOL.

FIGS. 37 and 38 show modified structure that may be substituted for previously described structure including the outer rotor ring and associated parts in the heating and cooling zones through which the turbine blades 57 travel. The modified structure is largely similar to the previously described structure as indicated by the use of corresponding numerals to designate corresponding parts.

FIGS. 37 and 38 show the usual lift blades 52a which are carried by outer end plates being connected to the outer rotor ring 75a by hinges 88a. The outer rotor ring 75a carries an outer hollow structure 105a which may be made of titanium and which differs in construction from the previously described hollow structure 105.

The outer hollow structure 105a may be termed a plenum since it serves the function of a plenum in distributing cooling air circumferentially of the rotor ring 75a. The plenum 105a carries the turbine blades 57a as heretofore described and is formed with an inclined upper wall 74 that is provided with numerous apertures 275 for airflow therethrough. Inside the plenum 105a is a vertical partition 276 which is formed with louvers 278 for airflow therethrough and which serves as a shield to protect the outer rotor ring 75a from heat radiating from the region of the turbine blades.

The outer rotor 75a may be made in alternate sections, one section being shown in FIG. 37 and an alternate section being shown in FIG. 38. The section of the outer rotor ring 75a that is shown in FIG. 37 is provided with an ample air passage 280 therethrough for airflow into the plenum 105a.

As shown in FIG. 37, each of the louvered plates 282 is opposite an air passage 280 and is formed with louvers for downward air flow therethrough and is further provided with an enclosing frame of polygonal cross section. The frame connects to the outer rotor ring 75a to duct the air flow through the annular space between the louvered plate and the rotor ring. The louvered plate 282 is attached by the rectangular duct 284 to the outer cylindrical ring 75a in areas alternating with the attachment of the outer hinge 88. The louvered plate extends (without louvers) a short distance radially beyond the ends of the duct 284. At each of these ends, the fairing sheet 283 is attached and supported by 282. The fairing sheet is cut out to clear the lift blade 52a which passes through it. The fairing sheet 282 is removed with lift blade 52a when the lift blade must be removed.

As indicated by the arrows in FIG. 37, cooling streams of air created by the lift blades 52a of the rotor pass through the louvers 282 and flow through the corresponding air passage 280 of the rotor ring 75a into the interior of the plenum 105a for distribution into the engine compartment. In this region the titanium material of the plenum 105a is cooled by circulating air as indicated by arrows in FIG. 37. Some of the air flows upward through the apertures 275 in the upper inclined wall 274 and in this region the exhaust manifold 60a is preferably covered with an insulation layer 286. Some of the cooling air also flows downward out of the plenum 105a through apertures 288 in the bottom wall of the plenum.

As indicated by arrows in FIG. 38 the turbine blades 57a function in the manner of fan blades to pump cooling atmospheric air into the exhaust manifold 100a. It can be seen in FIG. 38 that cooling air from the atmosphere above the outer rotor ring 75a is available to flow downward by the pumping action of the turbine blades past the turbine blades into the exhaust duct 100a. Air also flows out of the plenum 105a through the apertures 275 in the upper inclined wall 274 to join the stream of cooling air that flows downward past the turbine blades. The described arrangement provides effective protection against overheating of the aluminum outer rotor ring 75a in addition to preventing excessive heating of the titanium metal of the plenum 105a.

A further feature of the structure shown in FIGS. 37 and 38 comprises provisions which are made for causing the outer circumferential wall of the annular air duct 90 to follow the radial movements of the louvered plates 282 in response to expansion and contraction of the rotor ring 75a and the further provision of means to cause the exhaust duct 100a to follow the changes in position of the turbine blades 57a that are caused by expansion and contraction of the rotor ring. These provisions will now be described.

In a new manner the outer circumferential wall of the annular air duct 90 includes the louvered plates 282 but also includes a previously mentioned upper fixed circular wall 92a and a lower fixed circular wall 98a. The outer circumferential wall of the annular air duct 90 further includes a circumferential series of sections 289 which are connected to the fixed circular wall 92a by hinges 290 and which extend downward to fair with the upper edges of the louvered plates 282 or fairing 283. Each of these sections 289 is connected by links 291 to the elongated ears 139a of upper air bearings 134a for control by the air bearings.

FIGS. 37 and 38 further show how the outer circumferential wall of the annular air duct 90 may include a circumferential series of lower sections 293 which are mounted on the lower fixed wall 98a by hinges 294 and extend upward to the lower edges of the louvered plates 282. Each hinged section 293 is connected by a link 295 to a lower air bearing 135a for control thereby.

To keep the annular exhaust duct 100a aligned with the turbine blades 57a when the rotor ring 75a expands and contracts, the fixed circular walls 98a that forms the inner circumferential surface of the exhaust duct may be connected by hinges 300 to a circumferential series of sections 301 and these sections may be connected by links 302 to the lower bearings 135a or to the yokes 136a (FIG. 38) or the yokes 141a (FIG. 37) that carry the lower bearings. In like manner the outer fixed walls 116a of the annular exhaust duct 100a may support a circumferential series of sections 303 that are mounted on hinges 304 and at their upper edges mate with the exhaust ducts 60a of the turbojets. Each of the sections 303 may be connected by links 305 to yokes 136a (FIG. 38) or to yokes 141a (FIG. 37).

It is apparent that when the outer rotor ring 75a expands or contracts to shift the outer end plates 85a of the lift blades either radially outwardly or radially inwardly, the upper and lower bearings 134a are transmitted to the sections 289 by the links 291 and the movements of the lower air bearings 135 are transmitted to the sections 293 by the links 295. In the same manner the links 302 shift the sections 301 of the exhaust duct and the links 305 swing the sections 303 of the exhaust duct.

Our description in specific detail of the selected embodiment of the invention will suggest various changes, substitutions and other departures from our disclosure.

We claim:

1. In an aircraft of the character described, the combination of:
   a fuselage;
   an annular fan-type lift rotor rotating in an annular zone surrounding a central cargo space, said central cargo space being free from rotor structure,
   the inside radius of the annular zone being multiple times the radial dimension of the annular zone for relatively large cargo capacity of the aircraft;
   means at said annular zone journalling the rotor on the fuselage and transmitting the load of the fuselage to the rotor,
   the aircraft structure being open above and below said annular zone to cause the rotor to create an annular airstream through the rotor and downward from the rotor directly into the atmosphere immediately below the rotor;
   a circumferential series of turbine blades on the rotor at said annular zone;
   a plurality of circumferentially spaced gas generators supported by the fuselage to supply high velocity gaseous streams to the turbine blades for driving the rotor, said generators being radially outwardly of said annular zone to leave said cargo space free of gas-generating means;
   stator vanes on the fuselage separate from the lift rotor and located above and below the lift rotor in the annular airstream created by the lift rotor; and
   means to control at least some of said stator vanes on diametrically opposite sides of the aircraft differentially to control the flight of the aircraft.

2. A combination as set forth in claim 1 in which said fuselage is circular and has a frame with a portion overhanging the rotor, said frame including circumferentially distributed radial frame members and an outer ring member interconnecting the outer ends of the radial frame members with the radial frame members stressed in compression and with the ring members stressed in tension, said gas generators being supported by the overhanging portions of the frame.

3. A combination as set forth in claim 1 in which the stator vanes include stator vanes above the rotor for selective adjustment for local variation in the lift of the rotor to control the aircraft with respect to yaw, roll and pitch.

4. In an aircraft of the character described, the combination of:
   a fuselage;
   a fan-type rotor to apply lifting force to the fuselage;
   a circumferential series of turbine blades on the rotor;
   a plurality of circumferentially spaced gas generators supported by the fuselage to apply high velocity gaseous streams to the turbine blades for driving the rotor; and
   means to direct streams of cooling air against the turbine blades in the regions between the gas generators to limit the temperature to which the turbine blades are heated thereby to make it possible to employ materials for the turbine blades that would not withstand higher temperatures.

5. A combination as set forth in claim 4 which includes means to divert to the region of the turbine blades a portion of the air stream created by the rotor.

6. A combination as set forth in claim 4 in which the circumferential region of the rotor is divided into heating zones and alternate cooling zones with gaseous streams from the gas generators directed against the turbine blades in the heating zones and with the turbine blades exposed to the atmosphere in the cooling zones to permit the turbine blades to pump atmospheric air for cooling effect on the turbine blades.

7. In an aircraft of the character described, the combination of:
   a fuselage;
   an inner ring;
   an outer ring;
   a circumferential series of lift blades interconnecting the two rings to constitute therewith a lift rotor,
   said blades being inclined in plan from radial positions and being hingedly connected at their opposite ends to the two rings respectively to permit the two rings to expand and contract independently of each other; and
   means to journal the lift rotor on the fuselage with freedom for expansion and contraction of the two rings.

8. A combination as set forth in claim 7 which includes annularly arranged bearing means for the two rings, said bearing means being radially expansile and contractile in response to expansion and contraction of the two rings.

9. A combination as set forth in claim 7 which includes annularly arranged bearing segments to journal the two rings respectively; and
   which includes pivoted supports for said bearing segments to permit radial movement of the bearing segments in response to expansion and contraction of the two rings.

10. A combination as set forth in claim 7 in which the means to journal the two rings includes air bearings above and below at least one of the two rings.

11. In an aircraft of the character described, the combination of:
   a fuselage;
   a fan-type rotor to apply lifting force to the fuselage, said rotor having an upper circumferential rail and a lower circumferential rail and being free to expand and contract radially in response to centrifugal force and thermal changes;
   a circumferential series of turbine blades on the outer circumference of the rotor;

a plurality of gas generators spaced around the outer circumference of the rotor to direct high velocity gaseous streams against the turbine blades to drive the rotor, said gas generators being free to move radially of the rotor in accord with expansion and contraction of the rotor;

gas bearings mounted on the fuselage to cooperate with said rails to permit the rotor to rotate with low frictional resistance, said gas bearings being free to move radially of the rotor to accommodate radial expansion and contraction of the rails; and means connecting at least some of said bearings with the gas generators whereby radial expansion and contraction of the rotor shifts the gas bearings radially of the rotor and the gas bearings in turn shift the gas generators radially of the rotor to follow radial expansion and contraction of the rotor.

12. a combination as set forth in claim 11 in which the gas generators are mounted above the turbine blades;

in which an exhaust duct for the hot gases is provided below the turbine blades; and in which at least a portion of the exhaust duct is movable radially of the rotor to follow radial expansion and contraction of the path of the turbine blades and is connected to at least one of the lower gas bearings for movement thereby radially of the rotor.

13. A combination as set forth in claim 11 in which an annular air duct is provided for the annular air stream created by the rotor;

in which a circular wall of the rotor forms a part of the air duct; and in which a portion of the air duct adjacent said wall of the rotor is free to move radially of the rotor and is connected to an air bearing that engages the lower rim of the rotor whereby the lower air bearing is moved radially of the rotor by its cooperation with the lower rail of the rotor and the movement of the air bearing is transmitted to said portion of the air duct to move said portion in accord with radial expansion and contraction of the rotor.

14. A combination as set forth in claim 13 in which a portion of the air duct immediately adjacent the upper edge of said wall of the rotor is movable radially of the rotor and is connected to an upper gas bearing for movement thereby in accord with radial expansion and contraction of the rotor; and in which a portion of the air duct immediately adjacent the lower edge of said wall of the rotor is movable radially of the rotor and is connected to a lower gas bearing for movement thereby in accord with radial expansion and contraction of the rotor.

15. In an aircraft of the character described, the combination of:

a fuselage;

a fan-type rotor to transmit lifting force to the fuselage;

air bearing means journalling the rotor on the fuselage, said air bearing means having a low-friction plastic surface in cooperation with the rotor;

a circumferential series of turbine blades carried by the rotor; and at least one turbojet to direct high velocity gaseous fluid against the turbine blades for actuation of the rotor, said turbojet incorporating a compressor stage and said compressor stage being connected to said air bearing means to supply air thereto.

16. In the body of an aircraft of the character described, the combination of:

a set of circumferentially distributed beams radiating from a central region of the aircraft;

a concentric ring member interconnecting the outer ends of the radial beams to form therewith a generally circular structure for the body the radial beams being preloaded in compression stress, the ring member being preloaded in tension stress, with the compression stress of the beams opposed by the tension stress of the ring member;

a concentric cylindrical ring of lesser diameter than the ring member connected to the radial beams and extending downward therefrom to stiffen the circular structure; and panels interconnecting the radial beams.

17. In an aircraft of the character described, the combination of:

a fan-type lift rotor;

a generally circular fuselage having a frame including radial frame members extending outward from a central region inboard of the rotor with the outer circumferential margin of the frame overhanging the rotor;

means journalling the rotor on the fuselage;

turbine blades on the outer circumferential portion only of the rotor; and a plurality of circumferentialy spaced gas generator means mounted on said outer circumferential margin of the frame outside of the circumference of the rotor to direct high velocity gaseous fluid against the turbine blades to drive the rotor.

18. A combination as set forth in claim 17 in which the frame includes a cylindrical ring adjacent the rotor of substantial vertical axial dimension to lend rigidity to the fuselage.

19. A combination as set forth in claim 17 in which the fuselage includes a ring-shaped frame member in an outer radial region thereof interconnecting the radial frame members with longitudinal compression stress in the radial frame members opposed by tension stress in the ring-shaped frame member.

20. In an aircraft of the character described, the combination of:

a fuselage providing an annular lift zone;

a fan-type lift rotor in said lift zone;

gas bearings on the fuselage operating between the fuselage and the rotor to transmit the weight of the fuselage to the rotor when the aircraft is in flight; and means responsive to the gas pressure n the gas bearings to detect the load imposed on the rotor when the aircraft is in flight.

21. In an aircraft of the character described, the combination of:

a fuselage;

a fan-type rotor to apply lifting force to the fuselage;

a circumferential series of turbine blades carried by the rotor;

a plurality of gas generators mounted on the fuselage to direct high velocity gaseous streams against the turbine blades for actuation of the rotor;

a circumferential hollow structure on the rotor interposed between the rotor and the turbine blades; and means to direct cooling air through the hollow structure to protect the rotor from the heating effect of the gaseous streams.

22. A combination as set forth in claim 21 which includes means to divert a portion of the air stream created by the rotor into and through the hollow structure.

23. A combination as set forth in claim 21 in which the hollow structure has openings for ingress and egress of atmospheric air and in which the egress openings are in communication with the region of the turbine blades above the turbine blades whereby the turbine blades in zones away from the gas generators serve as pump means to circulate air through the hollow structure and to cause the colling air to cool the turbine blades.

(References on following page)

References Cited

UNITED STATES PATENTS

| | | | |
|---|---|---|---|
| 2,777,649 | 1/1957 | Williams | 244—69 X |
| 2,863,621 | 12/1958 | Davis | 244—23 |
| 2,940,689 | 6/1960 | Howell | 244—12 |
| 3,051,415 | 8/1962 | Frost et al. | 244—23 |
| 3,312,425 | 4/1967 | Lennon et al. | 244—23 X |
| 2,978,206 | 4/1961 | Johnson | 244—23 |
| 3,173,520 | 3/1965 | Fisher | 244—119 X |
| 3,182,929 | 5/1965 | Lemberger | 244—12 |

FOREIGN PATENTS

| | | |
|---|---|---|
| 828,884 | 2/1960 | Great Britain. |
| 678,700 | 1/1964 | Canada. |
| 1,347,733 | 11/1963 | France. |

MILTON BUCHLER, Primary Examiner

J. E. PITTENGER, Assistant Examiner

U.S. Cl. X.R.

244—100